(12) United States Patent
Sagasaki et al.

(10) Patent No.: US 9,509,131 B2
(45) Date of Patent: Nov. 29, 2016

(54) NUMERICAL CONTROL APPARATUS

(75) Inventors: Masakazu Sagasaki, Tokyo (JP); Toru Takeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 88 days.

(21) Appl. No.: 14/418,208

(22) PCT Filed: Aug. 3, 2012

(86) PCT No.: PCT/JP2012/069881
§ 371 (c)(1),
(2), (4) Date: Jan. 29, 2015

(87) PCT Pub. No.: WO2014/020763
PCT Pub. Date: Feb. 6, 2014

(65) Prior Publication Data
US 2015/0194805 A1    Jul. 9, 2015

(51) Int. Cl.
| | | |
|---|---|---|
| *G05B 19/18* | (2006.01) | |
| *H02H 7/08* | (2006.01) | |
| *G05B 19/4062* | (2006.01) | |
| *G05B 19/406* | (2006.01) | |
| *H02H 7/085* | (2006.01) | |
| *H02P 29/00* | (2016.01) | |

(52) U.S. Cl.
CPC .......... *H02H 7/0822* (2013.01); *G05B 19/406* (2013.01); *G05B 19/4062* (2013.01); *H02H 7/085* (2013.01); *H02P 29/0044* (2013.01); *G05B 2219/42281* (2013.01); *G05B 2219/42289* (2013.01)

(58) Field of Classification Search
CPC combination set(s) only.
See application file for complete search history.

(56) References Cited

U.S. PATENT DOCUMENTS

| | | | |
|---|---|---|---|
| 4,531,524 A | * | 7/1985 | Mioduski ............... A61B 18/12 607/47 |
| 5,209,110 A | | 5/1993 | Sano et al. |
| 5,968,102 A | * | 10/1999 | Ichimaru ............ B60G 17/0152 280/5.5 |
| 6,257,348 B1 | | 7/2001 | Momochi et al. |

(Continued)

FOREIGN PATENT DOCUMENTS

| | | |
|---|---|---|
| JP | 03-180779 A | 8/1991 |
| JP | 07-274383 A | 10/1995 |
| JP | 10-080055 A | 3/1998 |

(Continued)

OTHER PUBLICATIONS

Japanese Office Action for JP 2012-557738 dated Feb. 5, 2013.

(Continued)

*Primary Examiner* — Jorge L Carrasquillo
(74) *Attorney, Agent, or Firm* — Sughrue Mion, PLLC; Richard C Turner

(57) ABSTRACT

To avoid overheating of a spindle motor as easy as possible, a numerical control apparatus measures a cycle time in machining a work (step S5), measures a current amount per unit cycle flowing to the spindle motor (steps S3 and step S4), calculates, on the basis of the measured current amount per unit cycle, a duty cycle time in which suppression of the occurrence of overheating of the spindle motor is guaranteed (step S6), determines on the basis of a comparison of the duty cycle time and the cycle time whether the spindle motor overheats (step S7), and, when the spindle motor overheats (Yes at step S7), delays a start of the next cycle by a wait time setting value Tw obtained by subtracting the cycle time from the duty cycle time (step S8, No at step S10, and step S11).

5 Claims, 20 Drawing Sheets

(56) References Cited

U.S. PATENT DOCUMENTS

| | | | |
|---|---|---|---|
| 2006/0207979 A1* | 9/2006 | Daniel | B23K 9/095 219/130.01 |
| 2007/0081800 A1* | 4/2007 | Hsiang | G06F 1/206 388/811 |

FOREIGN PATENT DOCUMENTS

| | | | |
|---|---|---|---|
| JP | 10-279204 A | | 10/1998 |
| JP | 11-216640 A | | 8/1999 |
| JP | 11-262289 A | | 9/1999 |
| JP | 11-341850 A | | 12/1999 |
| JP | 11341850 A | * | 12/1999 |
| JP | 2000-176696 A | | 6/2000 |
| JP | 2001-150200 A | | 6/2001 |
| JP | 3212510 B2 | | 9/2001 |
| JP | 2010-102416 A | | 5/2010 |

OTHER PUBLICATIONS

International Search Report for PCT/JP2012/069881 dated Oct. 16, 2012.

* cited by examiner

NUMERICAL CONTROL APPARATUS

CROSS REFERENCE TO RELATED APPLICATIONS

This application is a National Stage of International Application No. PCT/JP2012/069881 filed Aug. 3, 2012, the contents of all of which are incorporated herein by reference in their entirety.

FIELD

The present invention relates to a numerical control apparatus.

BACKGROUND

When a machining process for repeating acceleration and deceleration of a spindle motor in one cycle is repeatedly executed by a machine tool a plurality of times, in some case, the temperature of the spindle motor rises and finally the spindle motor overheats and urgently stops.

To deal with this problem, Patent Literature 1 discloses a technology for predicting a motor temperature from a motor temperature measured by a temperature sensor. According to the technology of Patent Literature 1, as measures against a likelihood that the predicted motor temperature is equal to or higher than a threshold to cause overheating, a method of reducing maximum speed of a motor, a method of increasing an acceleration/deceleration time constant of the motor and reducing the value of a motor current during acceleration and deceleration, and a method of increasing an operation stop time when a machine driven by the motor repeatedly performs the same operation pattern, and the like.

According to the technology of Patent Literature 1, the prediction of the motor temperature is performed on the basis of a relation between a motor average current obtained by measurement in advance and a motor temperature rise amount or the prediction of the motor temperature is performed using a function calculated in advance from an experiment data or the like for calculating a predicted motor temperature from a measured motor temperature difference in a predetermined cycle period. Changes of the motor acceleration/deceleration time constant, the motor maximum speed, and the operation stop time are adjusted to values set in advance.

CITATION LIST

Patent Literature

Patent Literature 1: Japanese Patent Application Laid-Open No. H10-80055

SUMMARY

Technical Problem

However, according to the technology described in Patent Literature 1, there is a problem in that a large-capacity memory that stores the relation between the motor average current and the motor temperature rise amount to predict the motor temperature is necessary. When the prediction of the motor temperature is performed using the function for calculating the predicted motor temperature from the measured motor temperature difference in the predetermined cycle period, there is a problem in that the experiment needs to be performed every time the type of the motor is changed. The adjustment of the motor acceleration/deceleration time constant, the motor maximum speed, and the operation stop time is performed using setting values (fixed values) set in advance. Therefore, there is a problem in that an adjustment effect is different depending on the setting values.

The present invention has been devised in view of the above and it is an object of the present invention to obtain a numerical control apparatus that can avoid overheating of a spindle motor as easy as possible.

Solution to Problem

In order to solve the aforementioned problems, a numerical control apparatus according to one aspect of the present invention is constructed in such a manner as to include: a cycle-time measuring unit that measures a cycle time in machining a workpiece; a current-amount measuring unit that measures a current amount per unit cycle flowing to a motor that drives a workpiece rotating shaft; a cycle-time calculating unit that calculates, on the basis of the measured current amount per unit cycle, a cycle time at which suppression of occurrence of overheating of the motor is guaranteed; a processing unit that determines on the basis of a comparison of a cycle time calculation value by the cycle-time calculating unit and a cycle time measurement value by the cycle-time measuring unit whether the motor overheats; and a delay unit that delays, when the processing unit determines that the motor overheats, a start of a next cycle by at least a value obtained by subtracting the cycle time measurement value from the cycle time calculation value.

Advantageous Effects of Invention

The numerical control apparatus according to the present invention suppresses occurrence of overheating of a spindle motor without a prior experiment or an input of detailed current/temperature characteristics for each motor. Therefore, it is possible to avoid the overheating of the spindle motor as easy as possible.

BRIEF DESCRIPTION OF DRAWINGS

FIG. 6 is a diagram for explaining an example of a machining program executed by the numerical control apparatus in the second embodiment.

FIG. 13-1 is a diagram for explaining an overview of processing executed by a spindle-motor-acceleration/deceleration combining unit.

FIG. 13-2 is a diagram for explaining the overview of the processing executed by the spindle-motor-acceleration/deceleration combining unit.

FIG. 14-1 is a diagram for explaining the overview of the processing executed by the spindle-motor-acceleration/deceleration combining unit.

FIG. 14-2 is a diagram for explaining the overview of the processing executed by the spindle-motor-acceleration/deceleration combining unit.

DESCRIPTION OF EMBODIMENTS

Embodiments of a numerical control apparatus according to the present invention are explained in detail below with reference to the drawings. Note that the present invention is not limited by the embodiments.

First Embodiment.

Figure 1:
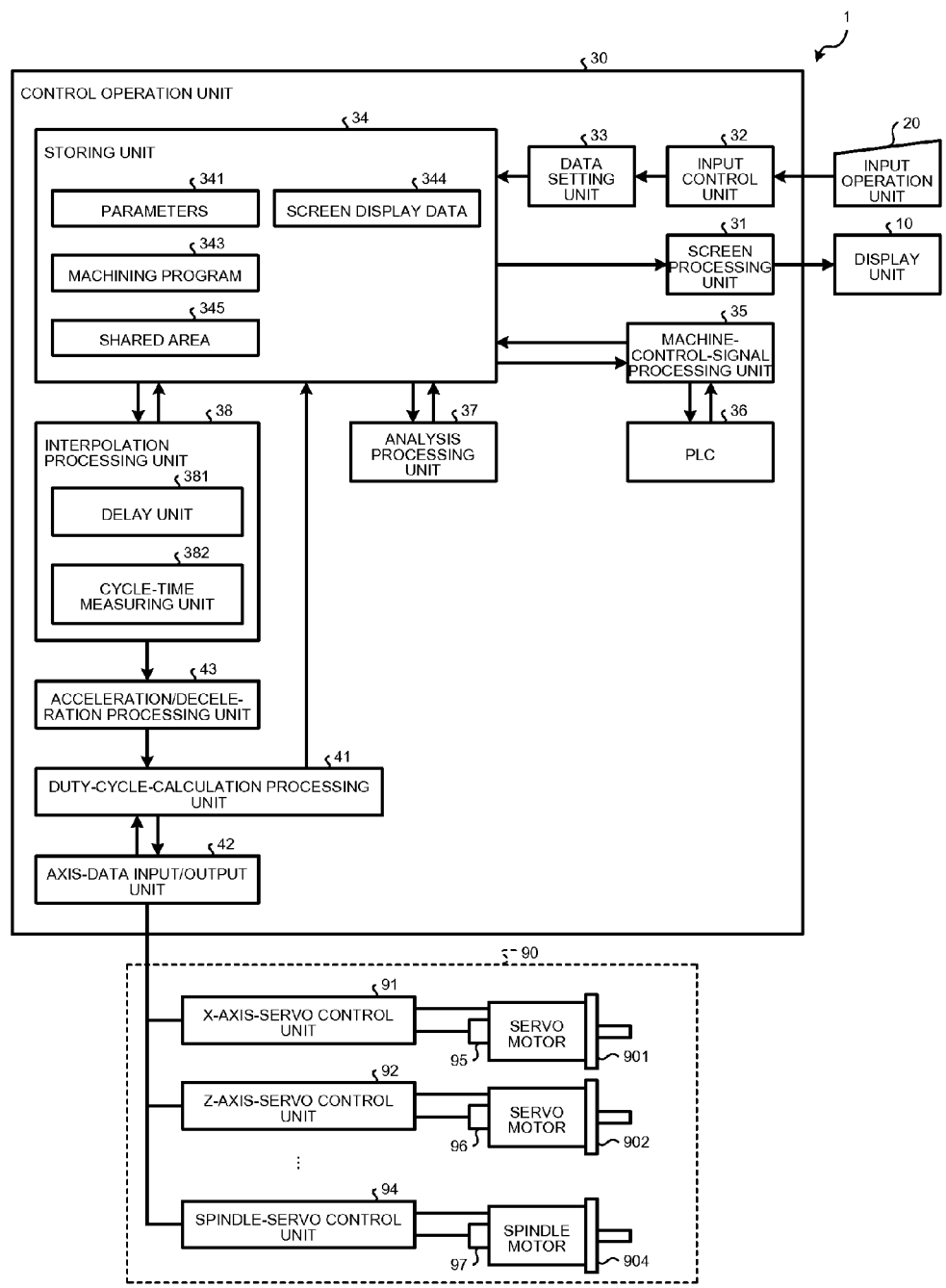
FIG. 1 is a diagram of the configuration of a numerical control apparatus in a first embodiment of the present invention.

FIG. 1 is a diagram of the configuration of a numerical control apparatus in a first embodiment of the present invention. As shown in the figure, a numerical control apparatus 1 includes a display unit 10, an input operation unit 20, a control operation unit 30, and a driving unit 90.

For example, a signal for an automatic start is supplied to the control operation unit 30 according to operation of an automatic start button (not shown in the figure) by a user. Upon receiving the signal for the automatic start, the control operation unit 30 starts a machining program 343. The control operation unit 30 generates, according to the machining program 343, a moving amount command for an X axis, a moving amount command for a Z axis, and a rotation command for a spindle (a workpiece rotating shaft) and supplies the generated commands to the driving unit 90.

The driving unit 90 includes an X-axis-servo control unit 91, a Z-axis-servo control unit 92, and a spindle-servo control unit 94 and drives an X-axis servo motor 901 and a Z-axis servo motor 902 according to the moving amount command for the X axis and the moving amount command for the Z axis input from the control operation unit 30. The driving unit 90 controls to rotate a spindle motor 904 according to a number-of-revolutions command for the spindle input from the control operation unit 30. The X-axis-servo control unit 91 receives feedback position data from an X-axis position sensor 95 of the X-axis servo motor 901 and performs position feedback control. Similarly, the Z-axis servo control unit 92 receives feedback position data from a Z-axis position sensor 96 of the Z-axis servo motor 902 and performs position feedback control. The spindle-servo control unit 94 receives feedback speed data or feedback position data from a spindle sensor 97 of the spindle motor 904 and performs speed feedback control or position feedback control.

The control operation unit 30 further includes a PLC (Programmable Logic Controller) 36, a machine-control-signal processing unit 35, a storing unit 34, an analysis processing unit 37, an interpolation processing unit 38, an acceleration/deceleration processing unit 43, an axis-data input/output unit 42, a screen processing unit 31, an input control unit 32, a data setting unit 33, and a duty-cycle-calculation processing unit (a cycle-time calculating unit, a processing unit) 41.

The storing unit 34 includes a region for storing parameters 341, a machining program 343, and screen display data 344. The storing unit 34 also includes a shared area 345 serving as a work space. The input operation unit 20 is configured by an input device such as a hardware switch or a touch panel. The parameters 341 and the machining program 343 are input to the data setting unit 33 through the input control unit 32 when an operator operates the input operation unit 20. The data setting unit 33 converts the input parameters 341 and the input machining program 343 into data and stores the data in the storing unit 34. The screen display data 344 stored in the storing unit 34 is read by the screen processing unit 31 and sent to the display unit 10. The display unit 10 includes a display device such as a liquid crystal panel and displays the sent screen display data 344 to enable the operator to visually recognize the screen display data 344.

The signal for the automatic start is input to the machine-control-signal processing unit 35 through the PLC 36. The machine-control-signal processing unit 35 receives the signal for the automatic start and instructs, via the storing unit 34 (for example, the shared area 345 of the storing unit 34), the analysis processing unit 37 to start execution of the machining program 343. The analysis processing unit 37 instructed to start the execution of the machining program 343 starts reading of the machining program 343.

The analysis processing unit 37 reads out the machining program 343 from the storing unit 34 according to the start instruction, performs analysis processing concerning blocks (rows) of the machining program 343, and passes a position command serving as an analysis result to the interpolation processing unit 38 via the shared area 345.

The interpolation processing unit 38 receives the analysis result (the position command) from the analysis processing unit 37, performs interpolation processing for the analysis result (the position command), and supplies a result of the interpolation processing (a moving amount and a rotating amount) to the acceleration/deceleration processing unit 43. The interpolation processing unit 38 receives a rotation command and a number-of-revolutions command for the spindle motor 904 from the analysis processing unit 37 via the shared area 345 and passes the rotation command and the number-of-revolutions command to the acceleration/deceleration processing unit 43.

The acceleration/deceleration processing unit 43 applies acceleration/deceleration processing to the result of the interpolation processing supplied from the interpolation processing unit 38. The acceleration/deceleration processing unit 43 outputs acceleration/deceleration processing results concerning the X axis and the Z axis to the duty-cycle-calculation processing unit 41. The acceleration/deceleration processing unit 43 performs the acceleration/deceleration processing for the spindle motor 904 and outputs an acceleration/deceleration processing result to the spindle-servo control unit 94 through the duty-cycle-calculation processing unit 41 and the axis-data input/output unit 42.

The duty-cycle-calculation processing unit 41 outputs the received acceleration/deceleration processing result to the X-axis-servo control unit 91 and the Z-axis-servo control unit 92 through the axis-data input/output unit 42.

The X-axis-servo control unit 91 receives the feedback position data from the X-axis position sensor 95 of the X-axis servo motor 901 and performs position feedback control. Similarly, the Z-axis servo control unit 92 receives the feedback position data from the Z-axis position sensor 96 of the Z-axis servo motor 902 and performs the position feedback control. The spindle-servo control unit 94 receives the speed feedback data or the position feedback data from the spindle sensor 97 of the spindle motor 904 and performs the speed feedback control or the position feedback control.

The spindle-servo control unit 94 detects an electric current of the spindle motor 904 and outputs the electric current to the duty-cycle-calculation processing unit 41 through the axis-data input/output unit 42. The duty-cycle-calculation processing unit 41 calculates, on the basis of the electric current of the spindle motor 904 received from the axis-data input/output unit 42, a minimum machining time in which suppression of the occurrence of overheating of the spindle motor 904 is guaranteed (hereinafter referred to as duty cycle time). The duty-cycle-calculation processing unit 41 compares a cycle time measured by a cycle-time measuring unit 382 explained below and the duty cycle time to determine whether the spindle motor 904 overheats.

The interpolation processing unit 38 includes a delay unit 381 and a cycle-time measuring unit 382.

The cycle-time measuring unit 382 is cyclically called by internal processing of the interpolation processing unit 38. The cycle-time measuring unit 382 measures a cycle time (time for one cycle) of the machining program 343 on the basis of the number of calling and a cycle (a calling interval) of the calling.

The delay unit 381 calculates a difference between the duty cycle time calculated by the duty-cycle-calculation processing unit 41 and the cycle time of the machining program 343 measured by the cycle-time measuring unit 382. When the measured cycle time of the machining program 343 is smaller than the duty cycle time calculated by the duty-cycle-calculating processing unit 41, the delay unit 381 delays a start of the next machining cycle by time of the difference.

Note that the control operation unit 30 is typically realized by a computer including a CPU (Central Processing Unit), a ROM (Read Only Memory), a RAM (Random Access Memory), and an I/O interface. Specifically, for example, the CPU executes a numerical control program stored in the ROM in advance to thereby function as the PLC 36, the machine-control-signal processing unit 35, the analysis processing unit 37, the interpolation processing unit 38, the acceleration/deceleration processing unit 43, the screen processing unit 31, the data setting unit 33, and the duty-cycle-calculation processing unit 41. The storing unit 34 is configured by the ROM or the RAM or both of the ROM and the RAM. Functions of the input control unit 32 and the axis-data input/output unit 42 are realized by the I/O interface. Note that the control operation unit 30 may be configured to realize a part or all of functional units, which are enumerated as being typically realized on the CPU, with hardware or a combination of the hardware and software (a numerical control program).

Figure 2:
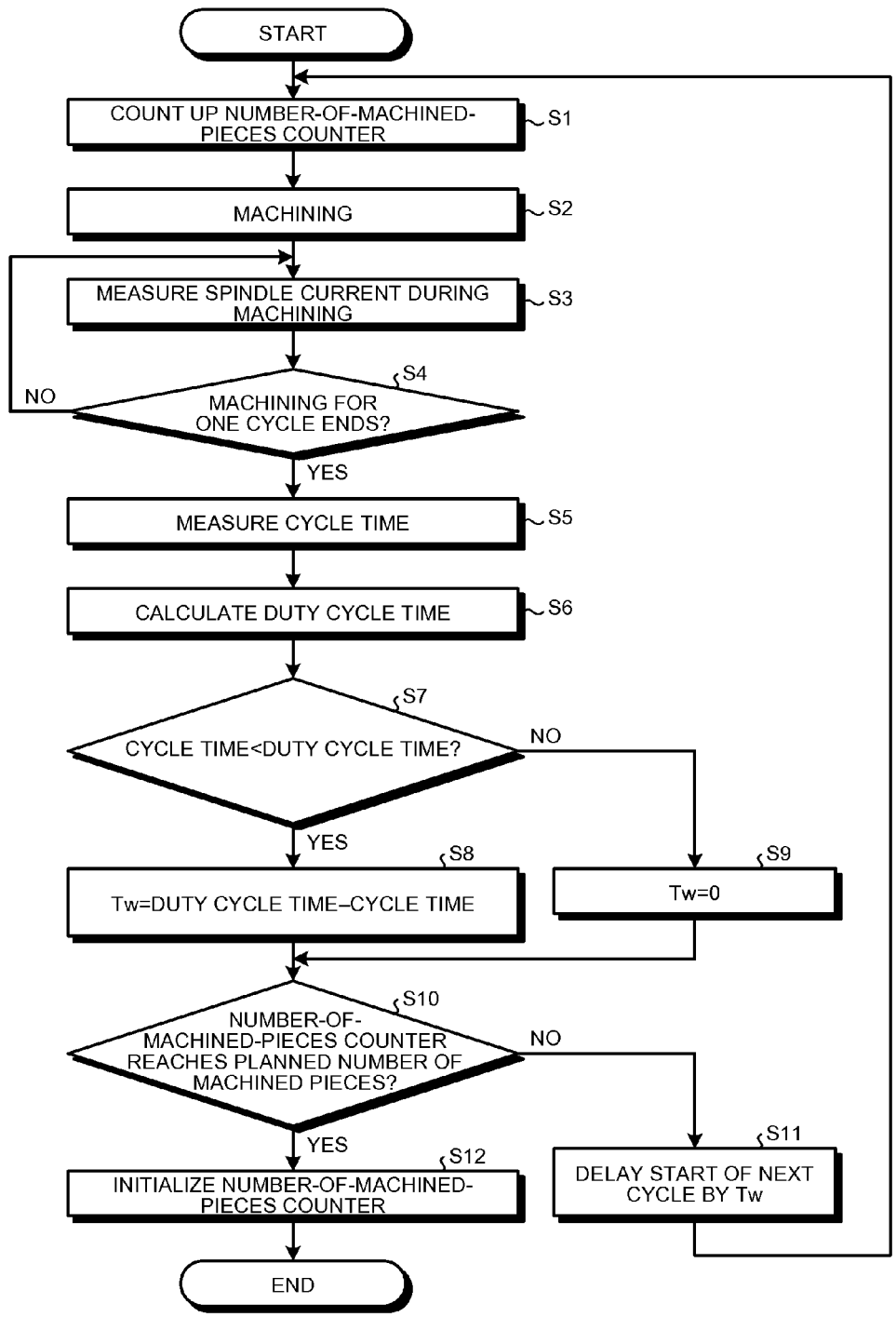
FIG. 2 is a flowchart for explaining the operation of the numerical control apparatus in the first embodiment.

FIG. 2 is a flowchart for explaining the operation of the numerical control apparatus 1 in the first embodiment.

When the operator performs operation for a start, the analysis processing unit 37 counts up (+1) a number-of-machined-pieces counter for measuring the number of machined works (workpieces) (the number of machined pieces) in the shared area 345 (step S1). Note that, in an initial state, a zero value is stored as a value of the number-of-machined-pieces counter. "1" is set by the first processing at step S1. The number-of-machined-pieces counter is set in, for example, the shared area 345.

Subsequently, the control operation unit 30 executes machining of the work (step S2). Details of processing at step S2 are specifically as explained below.

In the processing at step S2, first, the analysis processing unit 37 performs an analysis of the machining program 343 and passes an analysis result (a position command) of the machining program 343 to the interpolation processing unit 38. The interpolation processing unit 38 receives the analysis result (the position command) from the analysis processing unit 37, performs interpolation processing for the analysis result (the position command), and supplies a result of the interpolation processing to the acceleration/deceleration processing unit 43. The acceleration/deceleration processing unit 43 applies acceleration/deceleration processing to the supplied result of the interpolation processing and supplies an acceleration/deceleration processing result to the axis-data input/output unit 42 through the duty-cycle-calculation processing unit 41. Subsequently, the axis-data input/output unit 42 performs axis data output processing. That is, the axis-data input/output unit 42 supplies, a moving amount command ΔX for the X axis, a moving amount command ΔZ for the Z axis, or a number-of-revolutions command or a position command for the spindle, which is supplied from the duty-cycle-calculation processing unit 41, to the driving unit 90. The driving unit 90 drives the X-axis servo motor 901 and the Z-axis servo motor 902 according to the input moving amount command ΔX for the X axis and the input moving amount command Δz for the Z axis. The driving unit 90 subjects the spindle motor 904 to rotation control or position control according to the number-of-revolutions command or the position command for the spindle input from the axis-data input/output unit 42. The X-axis-servo control unit 91 receives feedback position data from the X-axis position sensor 95 of the X-axis servo motor 901 and performs position feedback control. Similarly, the Z-axis servo control unit 92 receives position feedback data from the Z-axis position sensor 96 of the Z-axis servo motor 902 and performs position feedback control. The spindle-servo control unit 94 receives speed feedback data or position feedback data from the spindle sensor 97 of the spindle motor 904 and performs speed feedback control or position feedback control.

During the execution of the processing at step S2, the duty-cycle-calculation processing unit 41 performs measurement of a current value flowing to the spindle motor 904 during machining (step S3). Specifically, the spindle-servo control unit 94 detects a feedback current from the spindle motor 904 and outputs the detected feedback current to the duty-cycle-calculation processing unit 41 through the axis-data input/output unit 42. The duty-cycle-calculation processing unit 41 classifies the received feedback current of the spindle motor 904 into a current value and time during acceleration, a current value and time during deceleration, and a current value and time during steady rotation and stores the feedback current in the shared area 345 of the storing unit 34.

Figure 3:
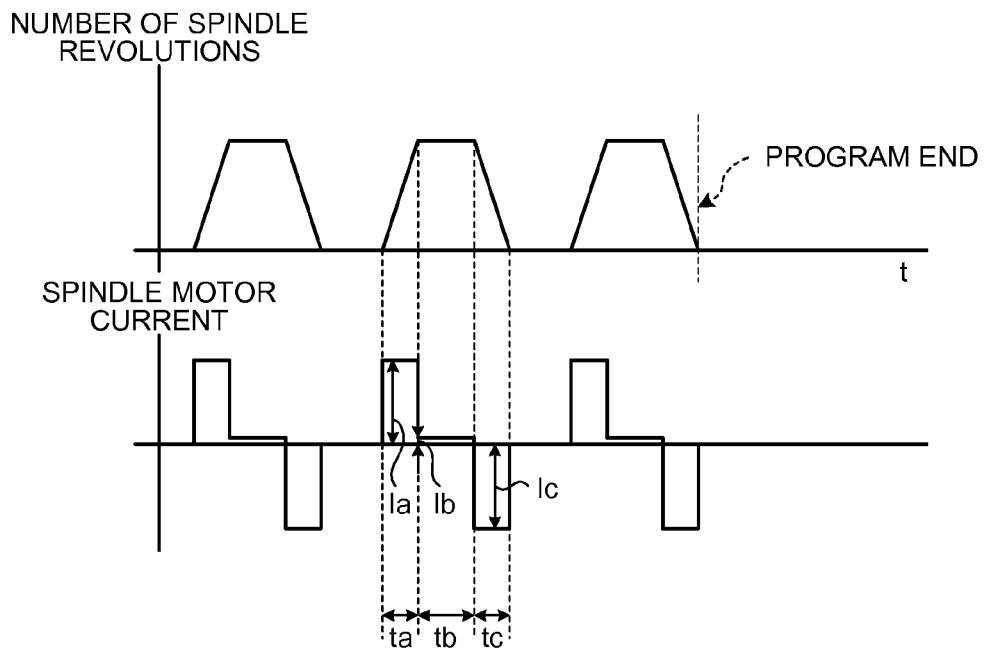
FIG. 3 is a diagram for explaining recording items by a duty-cycle-calculation processing unit.

FIG. 3 is a diagram for explaining recording items by the duty-cycle-calculation processing unit 41. As shown in FIG. 3, when the number of spindle revolutions includes a time transition in which the number of spindle revolutions is accelerated at fixed acceleration from a state of a zero value and reaches predetermined speed, then, is kept fixed at the speed, and is finally decelerated at the fixed acceleration and reaches the zero value, a current value Ia during the acceleration, time to during the acceleration, a current value Ib during the steady rotation, time tb during the steady rotation, a current value Ic during the deceleration, and time tc during the deceleration are recorded in the shared area 345 by the duty-cycle-calculation processing unit 41.

During the execution of the processing at step S2, the analysis processing unit 37 determines whether machining for one cycle has ended (step S4). When the machining for one cycle has not ended (No at step S4), the analysis processing unit 37 executes the determination processing at step S3 again. When the machining for one cycle has ended (Yes at step S4), the processing is advanced to step S5.

In processing at step S5, the cycle-time measuring unit 382 measures a cycle time (time for one cycle) of the machining program 343 (step S5). The cycle-time measuring unit 382 measures the cycle time of the machining program 343 on the basis of the number of calling and a cycle (a call cycle) of calling of processing of the cycle-time measuring unit 382.

The duty-cycle-calculation processing unit 41 substitutes the current value during the acceleration, the time during the acceleration, the current value during the steady rotation, the time during the steady rotation, the current value during the deceleration, and the time during the deceleration recorded in the shared area 345 in Formula 1 below and calculates a duty cycle time (step S6).

$$\text{Duty cycle time}=((\text{spindle acceleration time current}^2\times\text{acceleration time})+(\text{spindle deceleration time current}^2\times\text{deceleration time})+(\text{spindle steady time current}^2\times\text{steady rotation time}))/((\text{continuous rated output/short time rated output})^2) \quad (1)$$

Note that the continuous rated output and the short time rated output are constants determined for each spindle motor 904. The continuous rated output and the short time rated output are registered in the parameters 341 in advance by the operator and read out and used by the duty-cycle-calculation processing unit 41 according to the processing at step S6.

Subsequently, the duty-cycle-calculation processing unit 41 determines whether the cycle time obtained by the processing at step S5 is smaller than the duty cycle time obtained by the processing at step S6 (step S7). When the cycle time is smaller than the duty cycle time, this means that the spindle motor 904 overheats when continuous machining is performed. When the cycle time is smaller than the duty cycle time (Yes at step S7), the duty-cycle-calculation processing unit 41 calculates the wait time setting value Tw using Formula 2 below (step S8).

$$\text{Wait time setting value Tw}=\text{duty cycle time}-\text{cycle time} \quad (2)$$

When the cycle time is larger than the duty cycle time (No at step S7), the duty-cycle-calculation processing unit 41 sets the wait time setting value Tw to a zero value (step S9). Note that the duty-cycle-calculation processing unit 41 records the calculated wait time setting value Tw in the shared area 345.

After the processing at step S8 or step S9, the interpolation processing unit 38 determines whether a value of the number-of-machined-pieces counter stored in the shared area 345 has reached a planned number of machined pieces set in advance in the parameters 341 or the like (step S10). When the value of the number-of-machined-pieces counter has not reached the planned number of machined pieces (No at step S10), the delay unit 381 delays the start of the next machining by the wait time setting value Tw (step S11). Specifically, after staying on standby until the wait time setting value Tw elapses, the delay unit 381 issues a cycle start for starting the next machining. In this case, when the zero value is set in the wait time setting value Tw, the delay unit 381 issues the cycle start without a waiting time.

Figure 4:
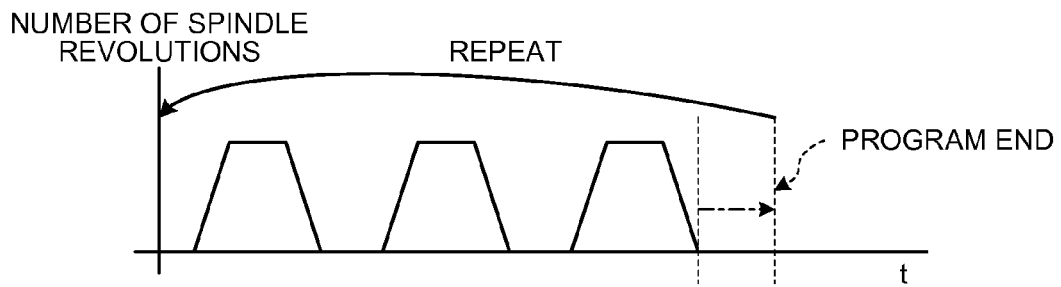
FIG. 4 is a diagram for explaining a state in which a machining start of the next cycle is put on standby by a wait time setting value Tw.

FIG. 4 is a diagram for explaining a state in which a machining start of the next cycle is put on standby for the wait time setting value Tw. As shown in FIG. 4, even after the machining for one cycle by the actual machining program 343 ends, the machining of the next cycle is started after being put on standby in a stop state for the wait time setting value Tw.

When the value of the number-of-machined-pieces counter has reached the planned number of machined pieces (Yes at step S10), the interpolation processing unit 38 initializes (zero-clears) the value of the number-of-machined-pieces counter (step S12), and the operation of the numerical control apparatus 1 ends.

Figure 9:
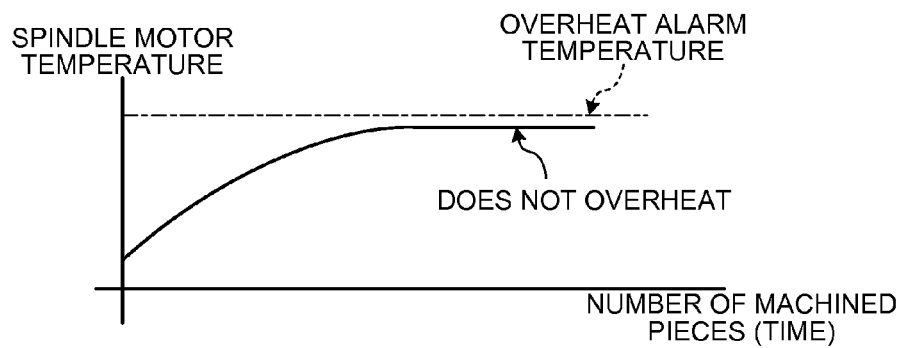
FIG. 9 is a diagram for explaining transition of the temperature of a spindle motor during continuous operation.

FIG. 9 is a diagram for explaining transition of the temperature of the spindle motor 904 that occurs when continuous operation is performed by applying the operation explained above. When there is a risk of occurrence of overheating, a halt time is inserted in every one cycle machining. Therefore, even if the continuous operation is performed, as shown in FIG. 9, the spindle motor 904 does not reach temperature at which overhead alarm is generated.

As explained above, according to the first embodiment of the present invention, the numerical control apparatus 1 includes the cycle-time measuring unit 382 that measures a cycle time of machining of a work, the current-amount measuring unit that measures a current amount per a unit cycle flowing to the spindle motor 904, the cycle-time calculating unit that calculates, on the basis of the measured current value per the unit cycle, a duty cycle time in which suppression of the occurrence of overheating of the spindle motor 904 is guaranteed, the duty-cycle-calculation processing unit 41 functioning as the processing unit that determines on the basis of the comparison of the duty cycle time and the cycle time whether the spindle motor 904 overheats, and the delay unit 381 that delays, when the duty-cycle-calculation processing unit 41 determines that the spindle motor 904 overheats, a start of the next cycle by the wait time setting value Tw obtained by subtracting the cycle time from the duty cycle time. Consequently, the numerical control apparatus 1 can suppress occurrence of overheating of the spindle motor 904 without a prior experiment and an input of a detailed current/temperature characteristic of each motor. That is, the numerical control apparatus 1 can avoid overheating of the spindle motor 904 as easy as possible.

Note that the delay unit 381 is explained as delaying the start of the next cycle by the wait time setting value Tw. However, a delay amount can exceed the wait time setting value Tw.

The numerical control apparatus 1 further includes the storing unit 34 that stores in advance rated outputs (a continuous rated output and a short time rated output) of the spindle motor 904. The cycle-time calculating unit calculates a duty cycle time using the rated outputs of the spindle motor 904 stored by the storing unit 34. Consequently, the numerical control apparatus 1 can suppress the occurrence of overheating of the spindle motor 904 without a prior experiment and an input of a detailed current/temperature characteristic of each motor.

Second Embodiment.

Figure 5:
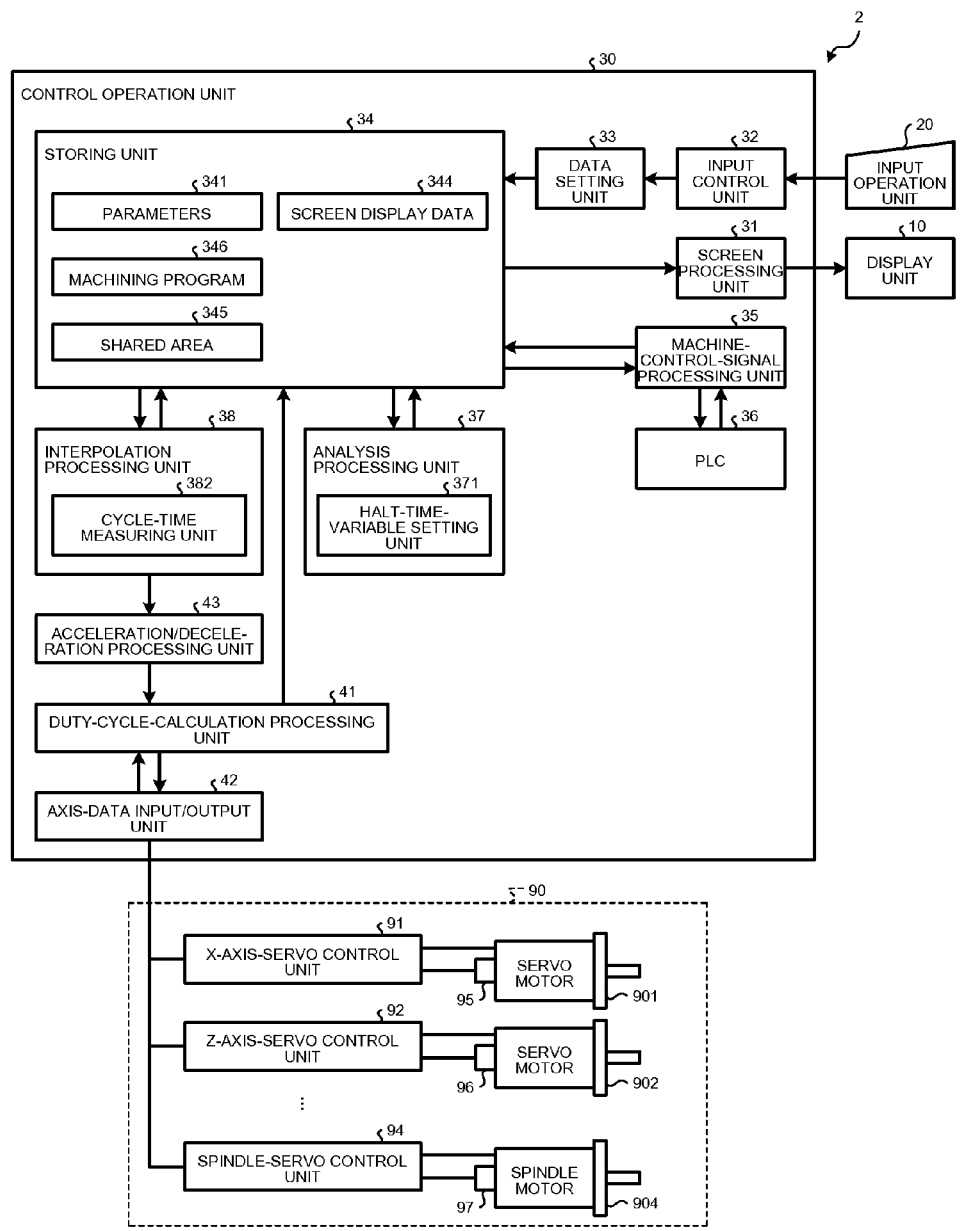
FIG. 5 is a diagram of the configuration of a numerical control apparatus in a second embodiment of the present invention.

FIG. 5 is a diagram of the configuration of a numerical control apparatus in a second embodiment of the present invention. Note that components same as the components in the first embodiment are denoted by the same names and the same reference numerals and signs and redundant explanation of the components is omitted.

As shown in the figure, a numerical control apparatus 2 in the second embodiment is different from the first embodiment in that the delay unit 381 is omitted from the interpolation processing unit 38, in that a halt-time-variable setting unit 371 is added to the analysis processing unit 37, and in that a machining program 346 is stored in the storing unit 34 in advance instead of the machining program 343.

FIG. 6 is a diagram for explaining an example of the machining program 346 executed in the numerical control apparatus 2 in the second embodiment. As shown in the figure, according to the machining program 346, a dwell command (G4U#5500) for standing still by a designated numerical value or variable is inserted before a rewind command (M99) described at a program end. The rewind command (M99) is a command for jumping control to the head of the machining program 346 without a start signal of the machining program 346. G4 in G4Ux means the dwell command. A numerical value or variable x described after U is a numerical value or a variable for designating a halt time. That is, G4U#5500 means a command for halting by time designated by the variable #5500. Note that a variable other than #5500 can be adopted as the variable for designating the halt time.

The halt-time-variable setting unit 371 substitutes the wait time setting value Tw calculated by the duty-cycle-calculation processing unit 41 for the variable for designating the halt time. The analysis processing unit 37 analyzes the dwell command, to the variable of which the wait time setting value Tw is set, and outputs an analysis result for delaying the start of the next cycle by the wait time setting value Tw. That is, according to the second embodiment, the analysis processing unit 37 including the halt-time-variable setting unit 371 functions as a delay unit.

Figure 7:
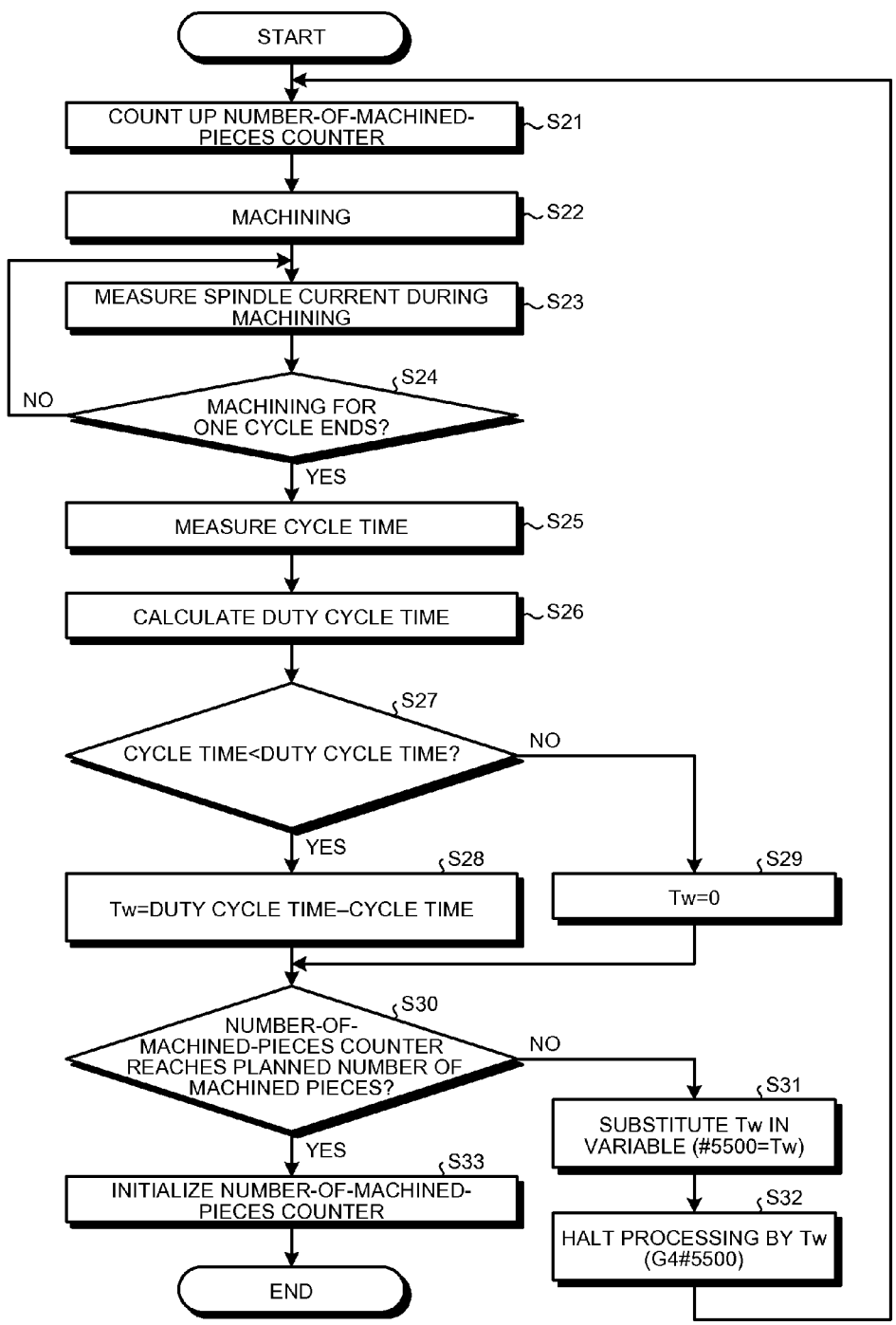
FIG. 7 is a flowchart for explaining the operation of the numerical control apparatus in the second embodiment.

FIG. 7 is a flowchart for explaining the operation of the numerical control apparatus 2 in the second embodiment.

As shown in FIG. 7, at step S21 to step S30, kinds of processing same as the kinds of the processing at step S1 to step S10 in the first embodiment are respectively executed. When it is determined in the determination processing at step S30 that the value of the number-of-machined-pieces counter has not reached the planned number of machined pieces (No at step S30), the halt-time-variable setting unit 371 substitutes the wait time setting value Tw in the variable #5500 (step S31). Then, the analysis processing unit 37 halts for the time corresponding to the wait time setting value Tw on the basis of an analysis result of the dwell command (G4U#5500), for the variable #5500 of which the wait time setting value Tw is substituted (step S32). Thereafter, the analysis processing unit 37 analyzes the rewind command (M99) after the dwell command (G4U#5500) and jumps the control to the machining program 346, whereby processing at step S21 is executed.

Figure 8:
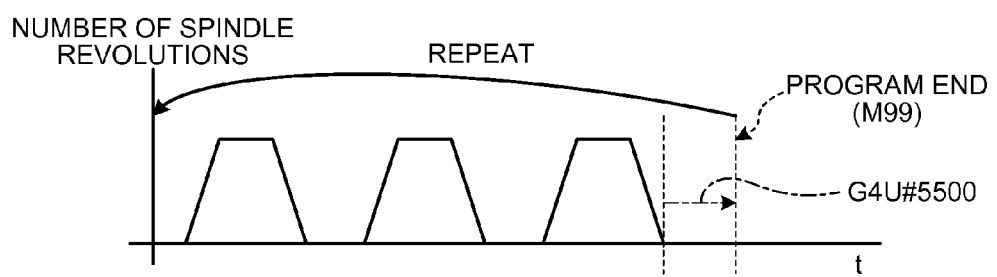
FIG. 8 is a diagram for explaining processing at step S32.

FIG. 8 is a diagram for explaining the processing at step S32. As shown in the figure, it is seen that the control is jumped to the head of the machining program 346 after waiting for the halt time designated by G4U#5500 at the program end.

When it is determined that the value of the number-of-machined-pieces counter has reached the planned number of machined pieces (Yes at step S30), at step S33, processing same as the processing at step S12 in the first embodiment is executed and the operation of the numerical control apparatus 2 ends.

In this way, according to the second embodiment of the present invention, the storing unit 34 stores in advance the machining program 346 including, before the rewind command (a rewind code), the dwell command (a halt code) for halting the machining by a delay amount to be set later. The halt-time-variable setting unit 371 sets the wait time setting value Tw to the delay time of the dwell command. Consequently, when there is a risk of occurrence of overheating, a halt time is inserted for the wait time setting value Tw in every one cycle machining. Therefore, the numerical control apparatus 2 can suppress the occurrence of overheating of the spindle motor 904.

Third Embodiment.

A numerical control apparatus in a third embodiment of the present invention executes a machining program by one cycle to display a value (hereinafter, margin time) obtained by subtracting a cycle time from a cycle time (a duty cycle time) in which it is guaranteed that the spindle motor 904 does not overheat. When the margin time is a minus value, the numerical control apparatus can display a warning (hereinafter, duty cycle warning) to the effect that the spindle motor 904 is likely to overheat soon.

Figure 10:
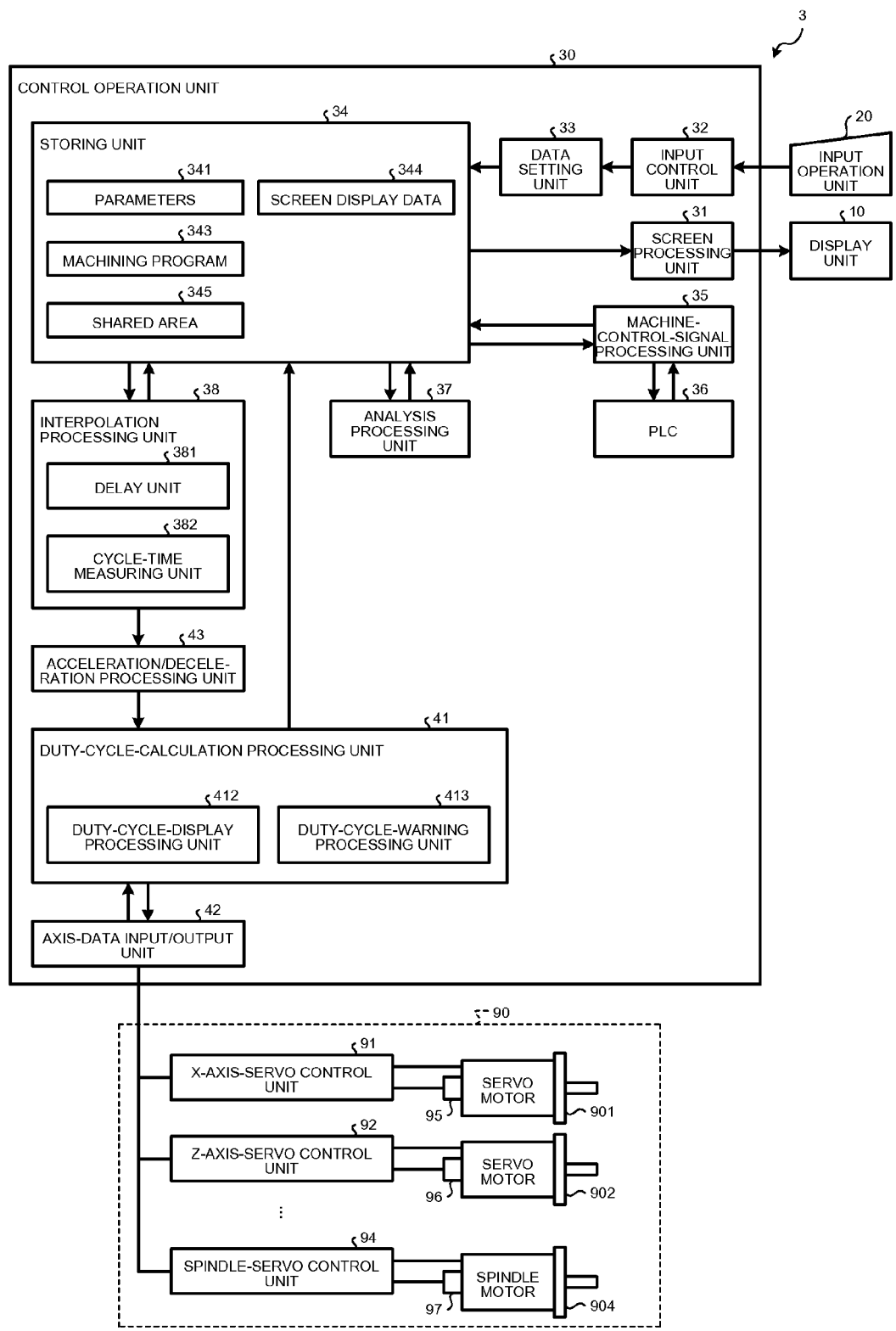
FIG. 10 is a diagram of the configuration of a numerical control apparatus in a third embodiment of the present invention.

FIG. 10 is a diagram of the configuration of the numerical control apparatus in the third embodiment of the present invention. Note that components same as the components in the first embodiment are denoted by the same names and the same reference numerals and signs and redundant explanation of the components is omitted. As shown in the figure, a numerical control apparatus 3 is different from the first embodiment in that the duty-cycle-calculation processing unit 41 further includes a duty-cycle-display processing unit (a display processing unit) 412 and a duty-cycle-warning processing unit (a display processing unit) 413.

The duty-cycle-display processing unit 412 subtracts the duty cycle time from the cycle time to calculate a margin time Td and displays the calculated margin time Td on the display unit 10. The duty-cycle-warning processing unit 413 determines whether the margin time Td is a minus value. If the margin time Td is the minus value, the duty-cycle-warning processing unit 413 displays the duty cycle warning on the display unit 10.

Figure 11:
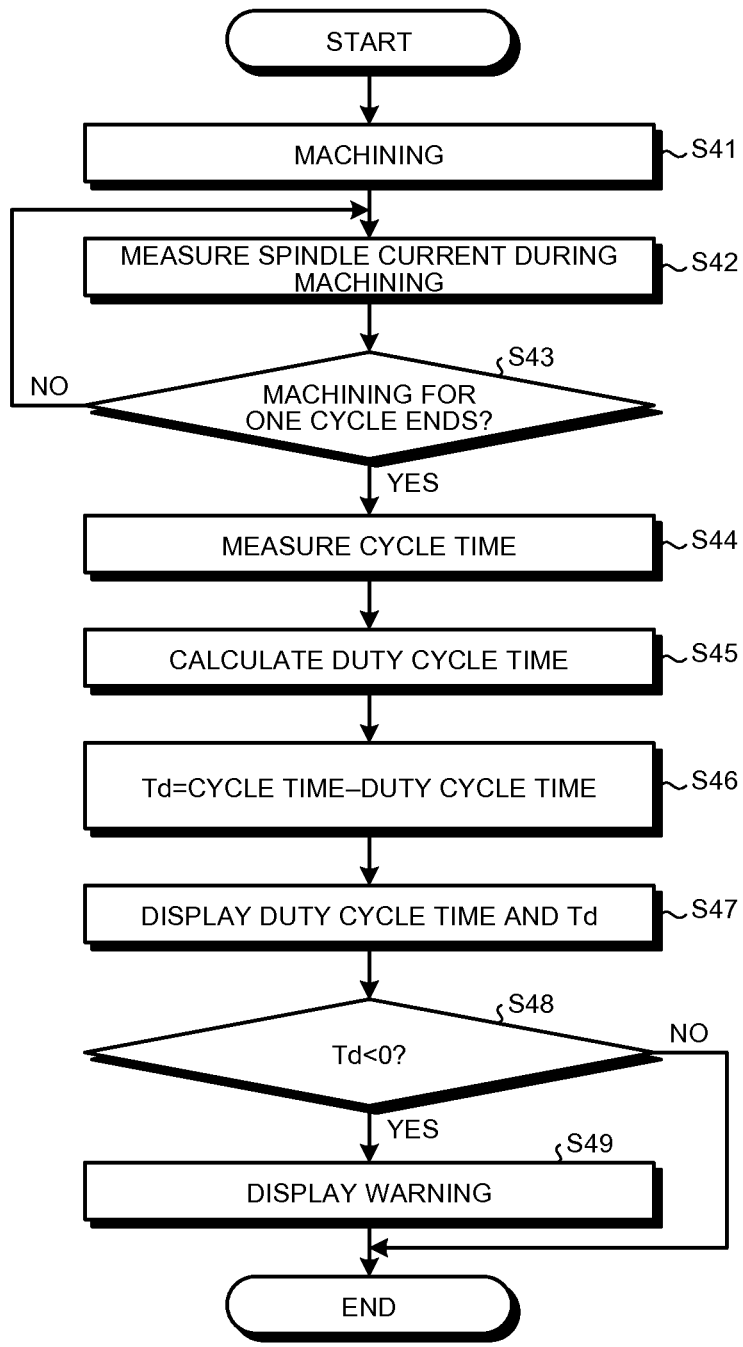
FIG. 11 is a flowchart for explaining the operation of the numerical control apparatus in the third embodiment.

FIG. 11 is a flowchart for explaining the operation of the numerical control apparatus 3 in the third embodiment. At step S41 to step S45, kinds of processing same as the kinds of processing at step S2 to step S6 in the first embodiment are respectively executed. After the processing at step S45, the duty-cycle-display processing unit 412 calculates the margin time Td (=cycle time−duty cycle time) (step S46) and displays the duty cycle time and the calculated margin time Td on the display unit 10 (step S47). Specifically, the processing at step S47 is executed when the duty-cycle-display processing unit 412 generates screen display data 344 for displaying the margin time Td and stores the generated screen display data 344 in the storing unit 34. The screen display data 344 for displaying the margin time Td stored in the storing unit 34 is read out by the screen processing unit 31 and displayed on the display unit 10. Note that, in the processing at step S47, the cycle time can be displayed instead of the margin time Td.

Thereafter, the duty-cycle-warning processing unit 413 determines whether a value of the margin time Td is a minus value (step S48). When the margin time Td is the minus value (Yes at step S48), the duty-cycle-warning processing unit 413 displays the duty cycle warning on the display unit 10 according to a method same as step S47 (step S49) and the operation of the numerical control apparatus 3 ends. When the value of the margin time td is a plus value (No at step S48), the processing at step S49 is skipped.

As explained above, according to the third embodiment of the present invention, the numerical control apparatus 3 includes the duty-cycle-warning processing unit 413 that displays a warning when the value obtained by subtracting the duty cycle time from the cycle time is a minus value. Consequently, the operator can learn in advance, simply by executing the machining program 343 for one cycle, whether it is likely that the spindle motor 904 overheats when the machining program 343 is continuously operated.

The numerical control apparatus 3 includes the duty-cycle-display processing unit 412 that displays the duty cycle time and the cycle time or a difference value between the cycle time and the duty cycle time. Consequently, even when the spindle motor 904 does not overheat, the operator can learn a margin degree until overheating of the spindle motor 904 and can refer to the margin degree when the operator reduces the cycle time of the machining program 343.

Fourth Embodiment.

Figure 12:
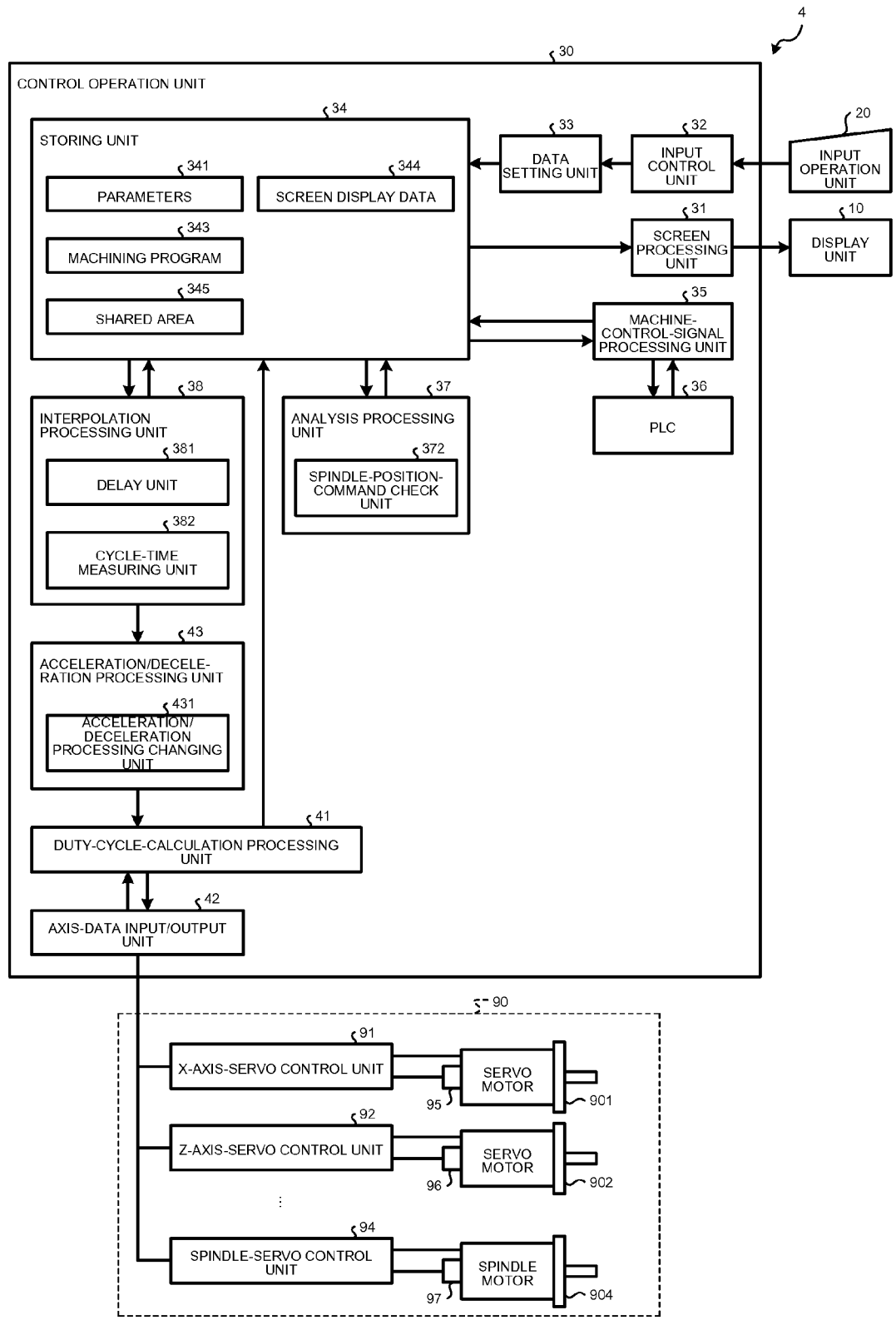
FIG. 12 is a diagram of the configuration of a numerical control apparatus in a fourth embodiment of the present invention.

FIG. 12 is a diagram of the configuration of a numerical control apparatus in a fourth embodiment of the present invention. Note that components same as the components in the first embodiment are denoted by the same names and the same reference numerals and signs and redundant explanation of the components is omitted. As shown in the figure, a numerical control apparatus 4 is different from the first embodiment in that the analysis processing unit 37 further includes a spindle-position-command check unit 372 and in that the acceleration/deceleration processing unit 43 further includes an acceleration/deceleration processing changing unit 431.

The spindle-position-command check unit 372 determines whether position commands for orient, a C axis, and the like are present between spindle rotation commands (rotation commands based on speed commands) in the machining program 343.

When it is determined that the position command is absent between the spindle rotation commands, in order to reduce the duty cycle time, the acceleration/deceleration processing changing unit 431 changes acceleration/deceleration processing of the spindle motor 904 so as not to execute a part or all of deceleration processing immediately before a section between the spindle rotation commands and a part of all of acceleration processing immediately after the section and to continue the rotation of the spindle motor 904 between the spindle rotation commands.

Figures 1, 13:
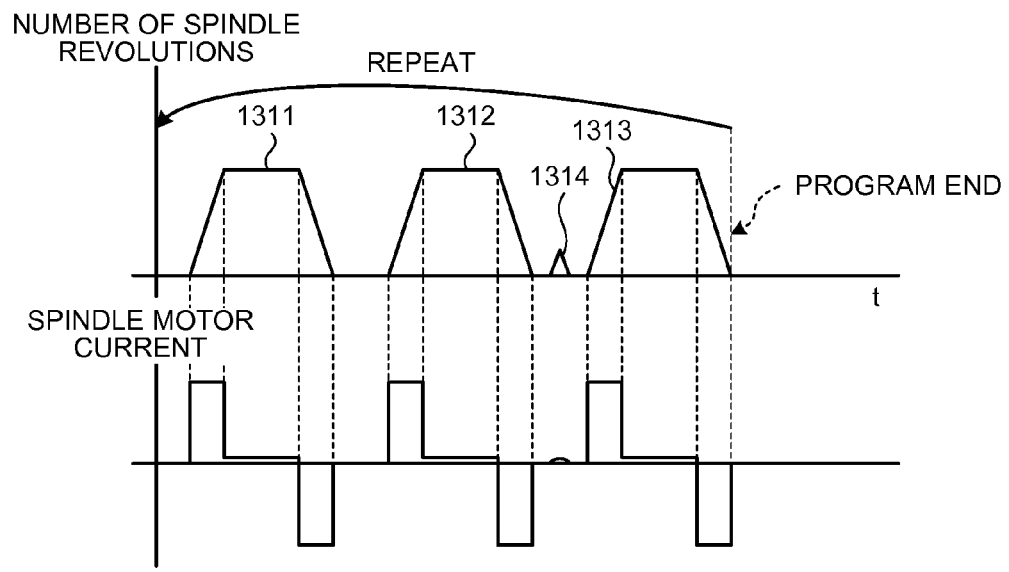
Figures 2, 13:
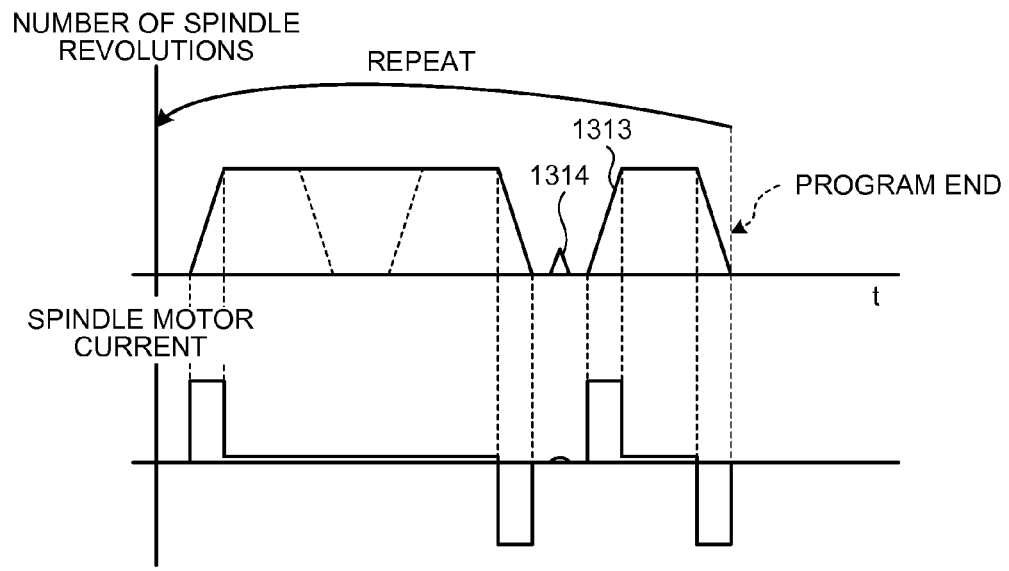

FIG. 13-1, FIG. 13-2, FIG. 14-1, and FIG. 14-2 are diagrams for explaining an overview of processing executed by the acceleration/deceleration processing changing unit 431. As shown in FIG. 13-1, when there are three rotation sections (rotation sections 1311, 1312, and 1313) based on a spindle rotation command for increasing the number of spindle revolutions at fixed acceleration, rotating the spindle motor 904 at a steady number of revolutions, and reducing the number of spindle revolutions at fixed acceleration, neither an orient command nor a C-axis command is present between the rotation section 1311 and the rotation section 1312, and a rotation section 1314 based on the orient command is present between the rotation section 1312 and the rotation section 1313, as shown in FIG. 13-2, the acceleration/deceleration processing changing unit 431 eliminates all of the deceleration processing for the rotation section 1311 and all of the acceleration processing for the rotation section 1312 and continues the rotation of the spindle motor 904 between the rotation section 1311 and the rotation section 1312. Consequently, one acceleration processing and one deceleration processing in which a consumed current is larger than an electric current consumed when the spindle motor 904 is rotated at fixed speed can be reduced. Therefore, it is possible to reduce the duty cycle time according to the relation of Formula 1.

Figures 1, 14:
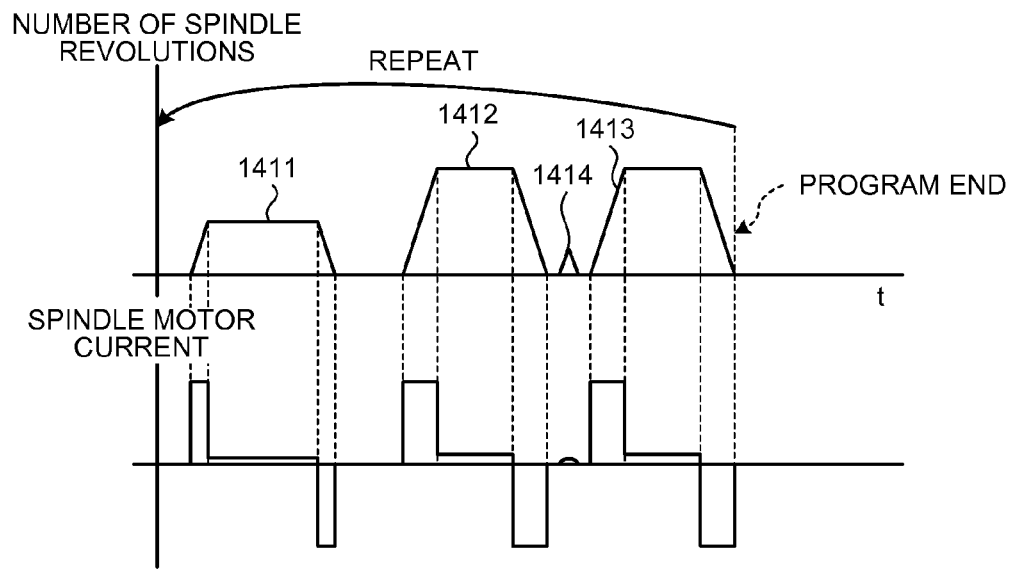
Figures 2, 14:
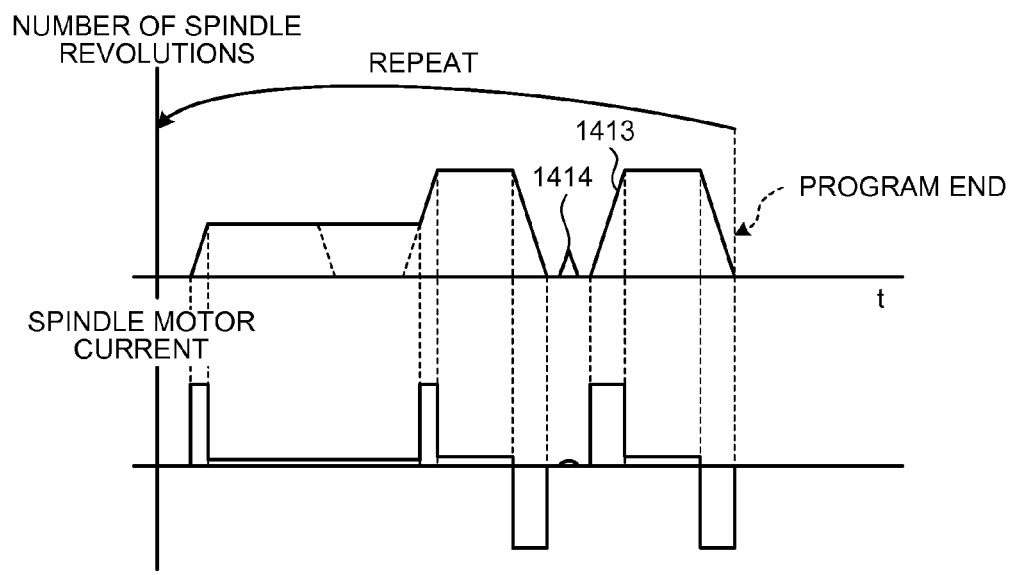

As shown in FIG. 14-1, when the number of spindle revolutions at fixed speed is smaller in the rotation section 1411 than in the other rotation sections 1412 and 1413 among the rotation sections 1411, 1412, and 1413, neither the orient command nor the C-axis command is present between the rotation section 1411 and the rotation section 1412, and the rotation section 1414 based on the orient command is present between the rotation section 1412 and the rotation section 1413, as shown in FIG. 14-2, the acceleration/deceleration processing changing unit 431 eliminates all of the deceleration processing for the rotation section 1411, continues the rotation of the spindle motor 904 between the rotation section 1411 and the rotation section 1412, and eliminates a part of the acceleration processing for the rotation section 1412 equivalent to the eliminated deceleration processing for the rotation section 1411. Consequently, one deceleration processing can be reduced and a part of the acceleration processing can be omitted. Therefore, according to the relation of Formula 1, it is possible to reduce the duty cycle time.

Note that the acceleration/deceleration processing changing unit 431 can change the acceleration and deceleration processing to gently increase speed at fixed acceleration from a fixed speed rotation state for the rotation section 1411 to a fixed speed rotation state for the rotation section 1412.

Note that a section in which the motor stops between two rotation periods based on speed control and position control is absent between the two rotation periods such as a section between the rotation section 1311 and the rotation section 1312 and a section between the rotation section 1411 and the rotation section 1412 is referred to as a spindle stop section.

Figure 15:
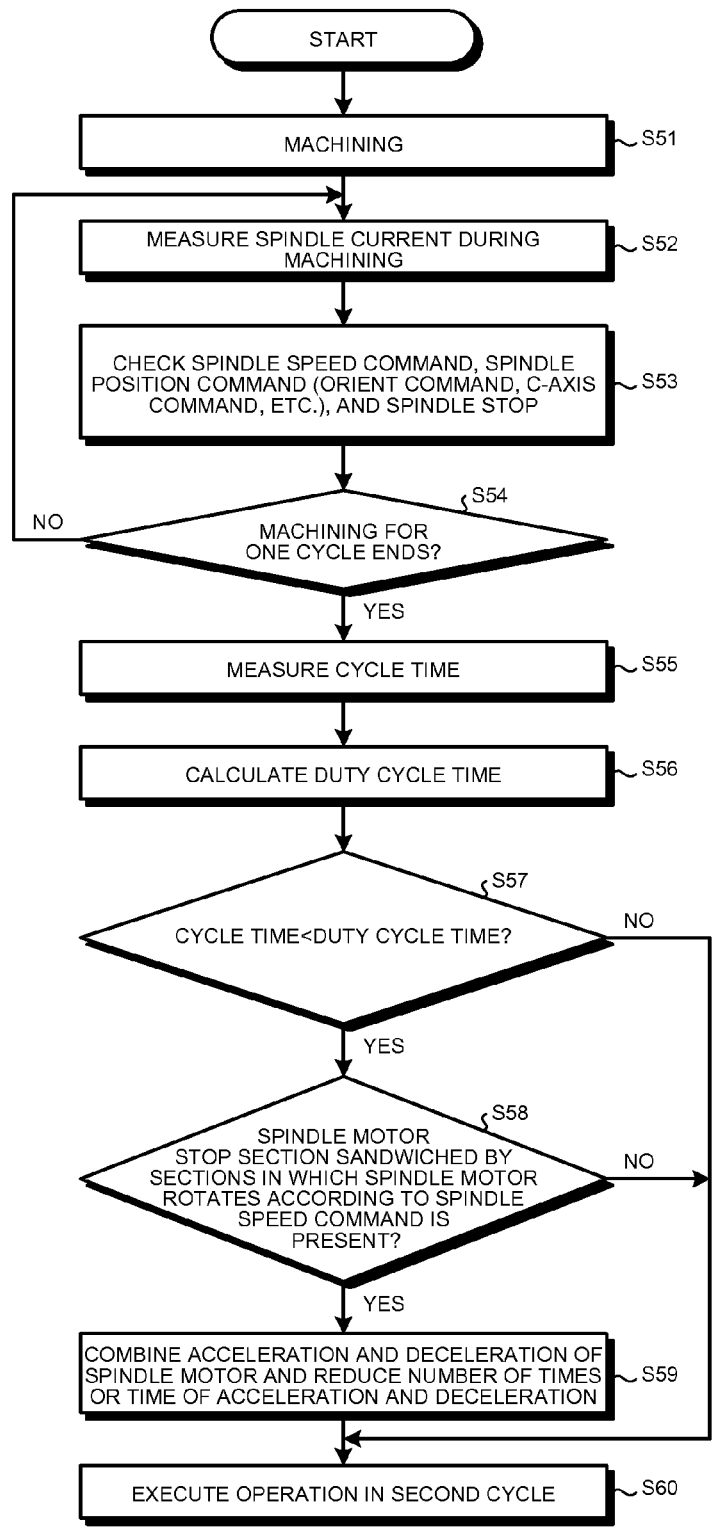
FIG. 15 is a flowchart for explaining the operation of the numerical control apparatus in the fourth embodiment.

FIG. 15 is a flowchart for explaining the operation of the numerical control apparatus 4 in the fourth embodiment. Note that the flowchart of FIG. 15 is a flowchart for explaining an operation in executing machining in a first cycle. Processing same as the processing in the first embodiment is executed in second and subsequent cycles.

As shown in FIG. 15, first, at step S51 and step S52, kinds of processing same as the kinds of processing at step S2 and step S3 are respectively executed. Thereafter, the spindle-position-command check unit 372 determines presence or absence of a position command between the spindle rotation commands (step S53). Specifically, the spindle-position-command check unit 372 checks whether the spindle is rotating according to a position command in this section or whether the spindle is stopped and stores information concerning the rotation of the spindle in the shared area 345.

Subsequently, in processing at step S54 to step S56, kinds of processing same as the kinds of processing at step S4 to step S6 are respectively executed. After the processing at step S56, as in the processing at step S7, the duty-cycle-calculation processing unit 41 determines whether the cycle time is smaller than the duty cycle time (step S57).

When it is determined that the cycle time is smaller than the duty cycle time (Yes at step S57), the acceleration/deceleration processing changing unit 431 determines presence or absence of a spindle stop section on the basis of the information stored in the shared area 345 by the processing at step S53 of the spindle-position-command check unit 372 (step S58). When the spindle stop section is present (Yes at step S58), the acceleration/deceleration processing changing unit 431 combines a deceleration period and an acceleration period before and after the spindle stop section and reduces the number of acceleration and deceleration (step S59). When the spindle stop section is absent (No at step S58), the processing at step S59 is skipped.

When it is determined in the determination processing at step S57 that the cycle time is larger than the duty cycle time (No at step S57), both of the processing at step S58 and the processing at step S59 are skipped.

Thereafter, the numerical control apparatus 4 executes an operation in a second cycle in the flowchart of FIG. 2 (step S60). That is, in the second cycle, if the wait time setting value Tw is a plus value, the next cycle start is delayed by the wait time setting value Tw. When the wait time setting value Tw calculated in the second cycle is a plus value and it is determined in the determination processing at step S58 in the first cycle that the spindle stop section is present, the duty cycle time is reduced by the processing at step S59. Therefore, a delay amount of a cycle start is reduced compared with the first embodiment. There is also a case in which the wait time setting value Tw calculated in the second cycle can be reduced to a zero value depending on time in which the duty cycle is reduced by the processing at step S59.

As explained above, according to the fourth embodiment of the present invention, the numerical control apparatus 4 is provided with the acceleration/deceleration processing changing unit 431 that determines presence or absence of the spindle stop section and, when the spindle stop section is present, changes the acceleration and deceleration processing for the spindle motor 904 so as not to execute a part or all of deceleration processing immediately before the spindle stop section and a part or all of acceleration processing immediately after the spindle stop section and to continue the rotation of the spindle motor 904 during the spindle stop section. Consequently, because the duty cycle time can be reduced, it is possible to reduce a halt time between cycle times as much as possible.

Fifth Embodiment.

With a numerical control apparatus in a fifth embodiment, the operator can learn, simply by performing machining one cycle, the number of machined pieces available until the spindle motor 904 overheats.

Figure 16:
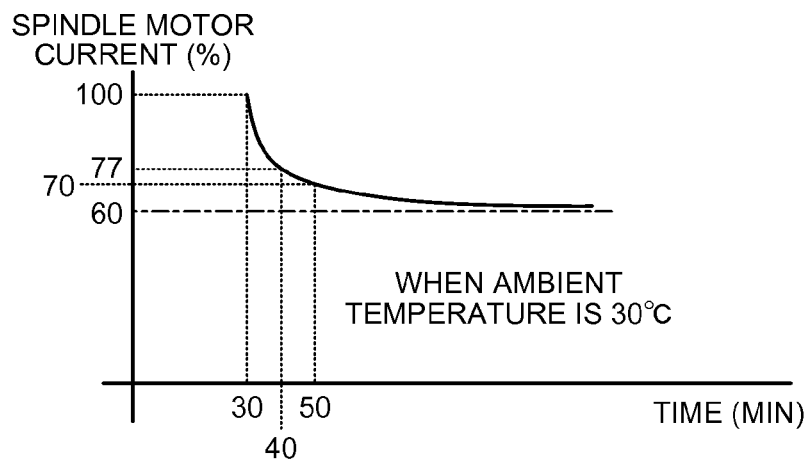
FIG. 16 is a diagram of a relation between a spindle motor current and a continuous operable time until occurrence of overheating.
Figure 17:
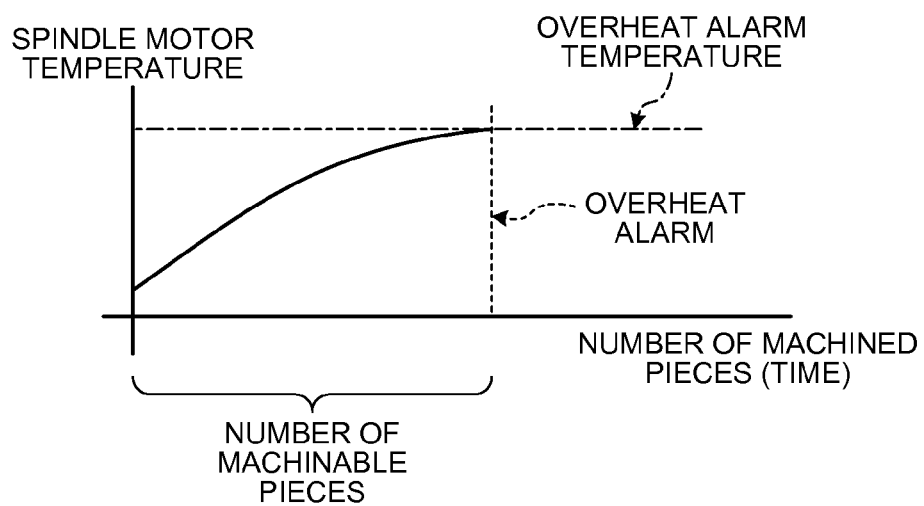
FIG. 17 is a diagram of a relation between a spindle motor temperature and the number of machined pieces.

FIG. 16 is a diagram of a relation between an electric current flowing to the spindle motor 904 and a continuous operation time until the occurrence of overheating of the spindle motor 904. A unit of a spindle motor current is percentage representation of a ratio to a rated current. For example, when a motor load is 100%, continuous machining can be performed for thirty minutes. When the motor load is 70%, the continuous machining can be performed for fifty minutes. When the motor load is 60%, the continuous machining can be performed without causing an overheat alarm. When the time in which the continuous machining is possible can be estimated, as shown in FIG. 17, it is possible to estimate the number of machined pieces until the occurrence of overheating of the spindle motor 904. The numerical control apparatus in the fifth embodiment stores in advance the relation shown in FIG. 16, measures an average of an electric current of the spindle motor 904, and displays, on the basis of a relation between the measured average and FIG. 16, the number of cycles, that is, the number of machined pieces executable until the spindle motor 904 overheats.

Figure 18:
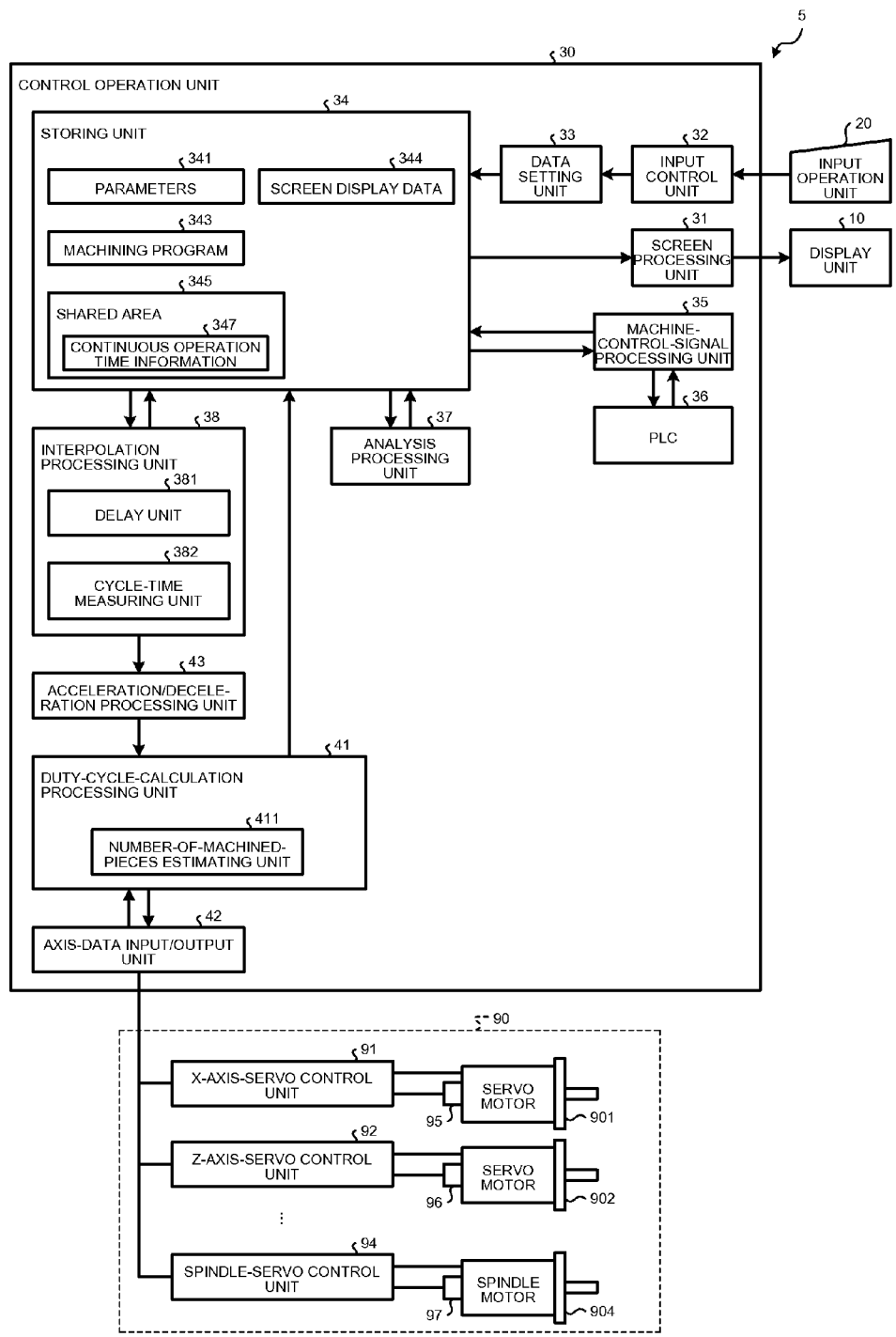
FIG. 18 is a diagram of the configuration of a numerical control apparatus in a fifth embodiment of the present invention.

FIG. 18 is a diagram of the configuration of the numerical control apparatus in the fifth embodiment of the present invention. As shown in the figure, the configuration of a numerical control apparatus 5 is different from the first embodiment in that the numerical control apparatus 5 stores continuous operation time information 347 in advance and in that the duty-cycle-calculation processing unit 41 includes a number-of-machined-pieces estimating unit (an estimation processing unit) 411.

The continuous operation time information 347 is information describing a relation between an electric current flowing to the spindle motor 904 and the time until the occurrence of overheating of the spindle motor 904 in a state in which the electric current flows. The continuous operation time information 347 is described by, for example, a lookup table or a function. The number-of-machined-pieces estimating unit 411 calculates time in which continuous machining is possible referring to the continuous operation time information 347 using the average of the electric current of the spindle motor 904 and divides the calculated time by the cycle time to calculate the number of pieces that can be continuously machined.

Figure 19:
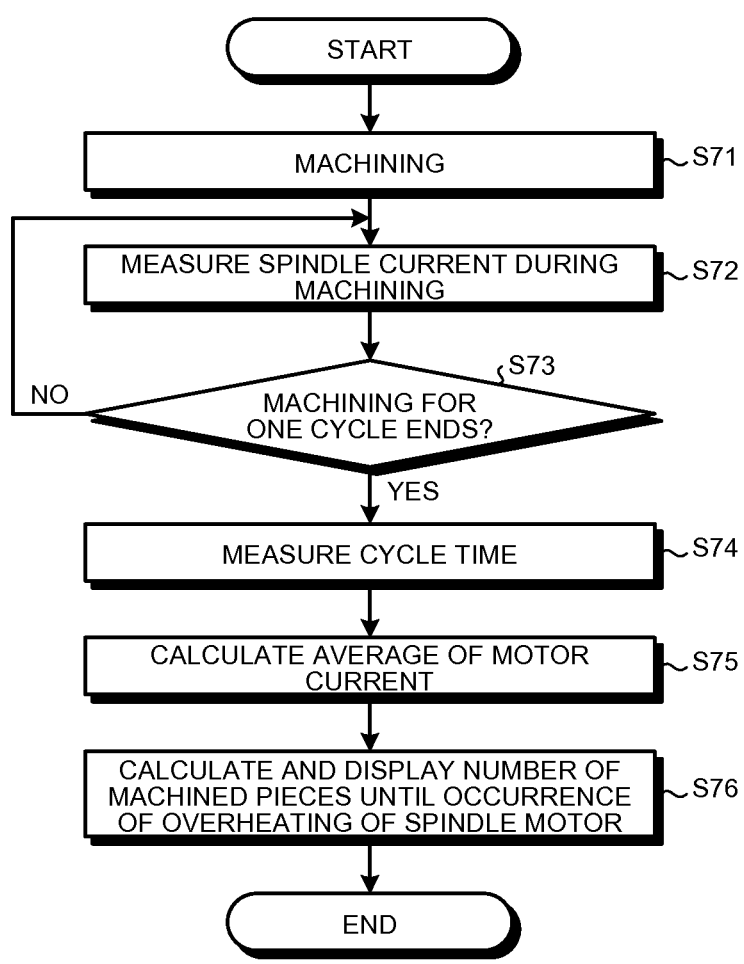
FIG. 19 is a flowchart for explaining the operation of the numerical control apparatus in the fifth embodiment.

FIG. 19 is a flowchart for explaining the operation of the numerical control apparatus 5 in the fifth embodiment. As shown in the figure, as kinds of processing at step S71 to step S74, kinds of processing respectively the same as the kinds of processing at step S2 to step S5 are executed.

After the processing at step S74, the number-of-machined-pieces estimating unit 411 calculates an average current value of the spindle motor current acquired at step S72 (step S75). The number-of-machined-pieces estimating unit 411 calculates, referring to the continuous operation time information 347 stored in the shared area 345, the number of machined pieces that can be continuously machined until the spindle motor 904 overheats (step S76).

For example, when the average current value of the spindle motor 904 is 70%, according to the relation shown in FIG. 16, time in which continuous machining can be performed is 50 minutes. The cycle time is measured in the processing at step S74. Therefore, the number of machined pieces until the occurrence of overheating of the spindle motor 904 can be calculated by dividing, by the cycle time, the time in which the continuous machining can be performed. For example, when the cycle time is 2 minutes, 50/2=25. The number of machined pieces until the occurrence of overheating of the spindle motor 904 is twenty-five. The calculated number of machined pieces is displayed on the display unit 10 through the screen processing unit 31 by the number-of-machined-pieces estimating unit 411. Rather than displaying the number of machined pieces until the occurrence of overheating of the spindle motor 904 on the display unit 10, it is also possible to directly display time until the occurrence of overheating of the spindle motor 904.

After the processing at step S76, the numerical control apparatus 5 ends the operation.

As explained above, according to the fifth embodiment of the present invention, the numerical control apparatus 5 includes the storing unit 34 that stores in advance the continuous operation time information 347 that describes a relation between an electric current flowing to the spindle motor 904 and time until the occurrence of overheating of the spindle motor 904 in a state in which the electric current flows, the cycle-time measuring unit 382 that measures a cycle time, the duty-cycle-calculation processing unit 41 functioning as the current-amount measuring unit that measures a current amount per a unit cycle flowing to the spindle motor 904, and the number-of-machined-pieces estimating unit 411 that estimates, on the basis of a cycle time measurement value by the cycle-time measuring unit, a current amount measurement value by the current-amount measuring unit, and the continuous operation time information, the time in which a work can be continuously machined or the number of machined pieces of the work that can be continuously machined without causing overheating of the spindle motor 904 and displays the time or the number of machined pieces. Consequently, the operator can learn, at a stage when one work has been machined, an estimated value of the time or the number of machined pieces until the occurrence of overheating of the spindle moor 904. Therefore, when the operator desires to machine several to several ten works, the operator can determine whether the machining is possible.

Sixth Embodiment.

Figure 20:
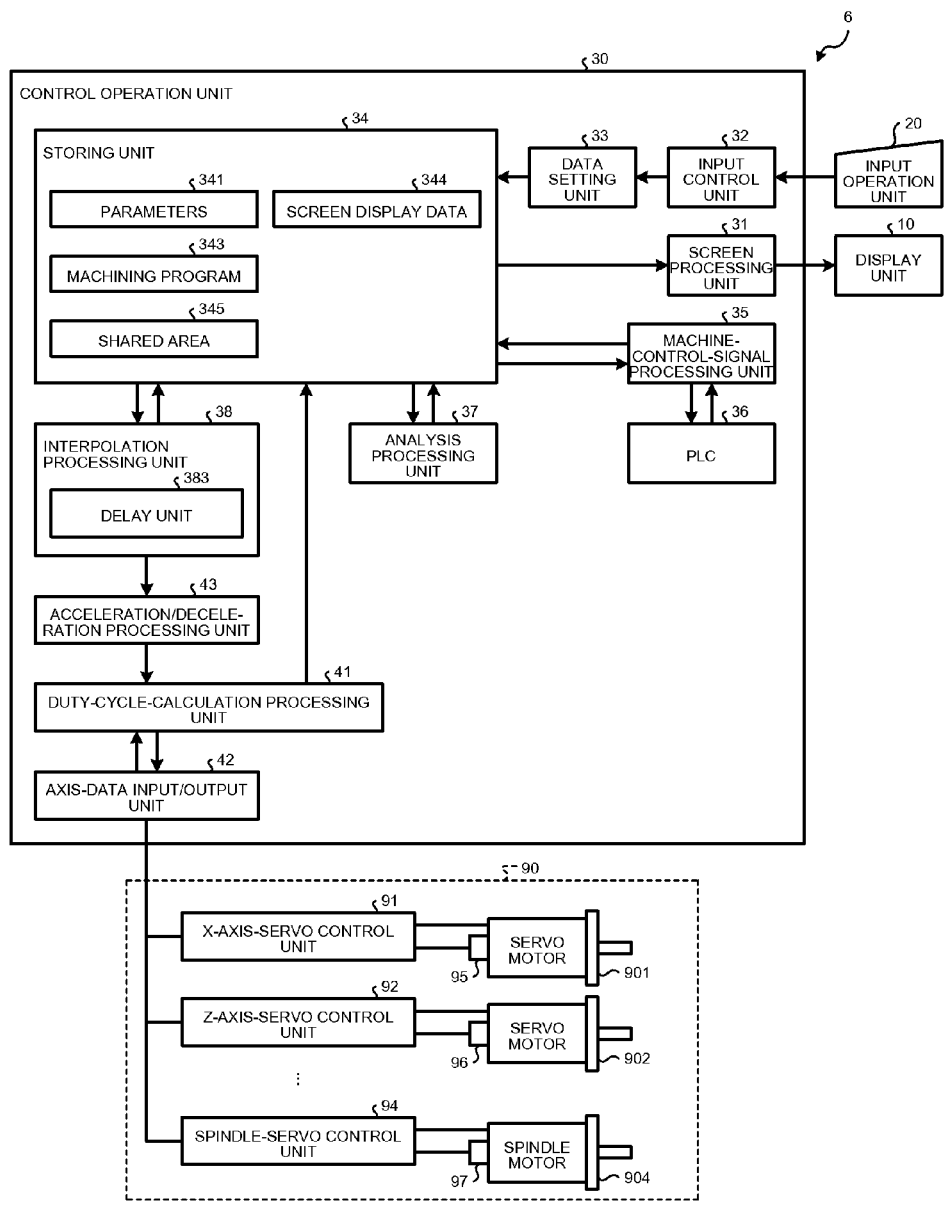
FIG. 20 is a diagram of the configuration of a numerical control apparatus in a sixth embodiment of the present invention.

FIG. 20 is a diagram of the configuration of a numerical control apparatus in a sixth embodiment of the present invention. As shown in the figure, the configuration of the numerical control apparatus 6 is different from the first embodiment in that the interpolation processing unit 38 includes a delay unit 383 instead of the delay unit 381 and the cycle-time measuring unit 382.

Figure 21:
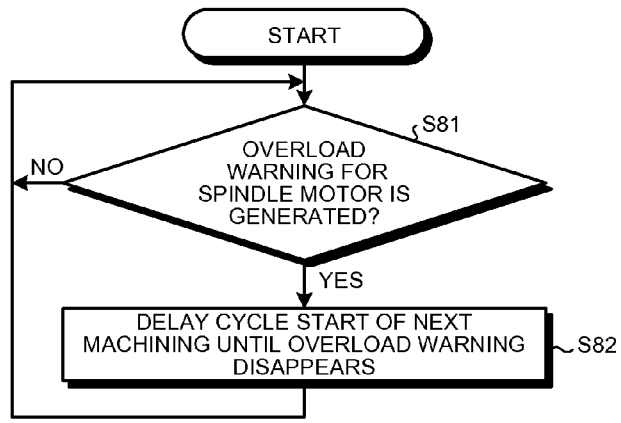
FIG. 21 is a flowchart for explaining the operation of the numerical control apparatus in the sixth embodiment.

FIG. 21 is a flowchart for explaining the operation of the numerical control apparatus 6 in the sixth embodiment. As shown in the figure, when the numerical control apparatus 6 starts continuous operation, the delay unit 383 determines whether an overload warning for the spindle motor 904, which is issued before the spindle motor 904 overheats, has been generated (step S81). When the overload warning for the spindle motor 904 has been generated (Yes at step S81), the delay unit 383 delays the next cycle start until the overload warning disappears (step S82). When the overload warning for the spindle motor 904 has not been generated (No at step S81) or after the processing at step S82, the delay unit 383 executes the determination processing at step S81 again.

Figure 22:
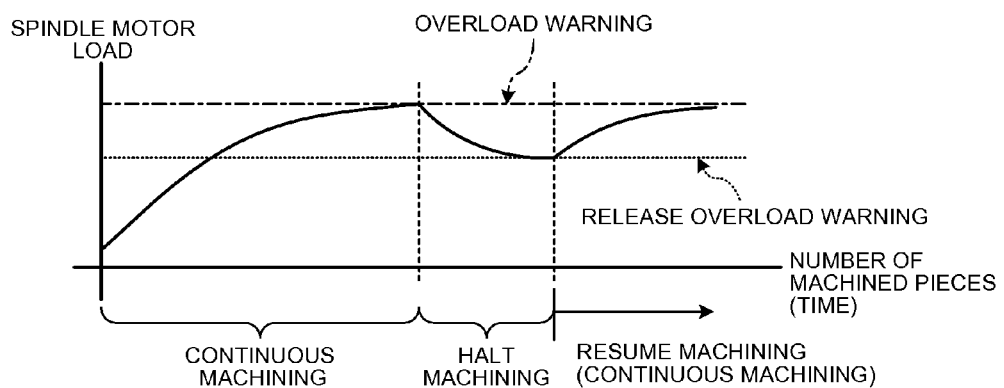
FIG. 22 is a diagram of a relation between a load of a spindle motor and the number of machined pieces (or time).

FIG. 22 is a diagram of a relation between a load of the spindle motor 904 and the number of machined pieces (or time) in machining executed by the numerical control apparatus 6. According to the sixth embodiment, the numerical control apparatus 6 includes the delay unit 383 that delays, when an overload warning for the spindle motor 904 is generated, a start of the next cycle until the generation of the overload warning is stopped. Consequently, as shown in FIG. 22, the machining is halted every time the spindle motor 904 is overloaded. As a result, it is possible to perform continuous machining without causing overheating of the spindle motor 904.

Seventh Embodiment.

Figure 23:
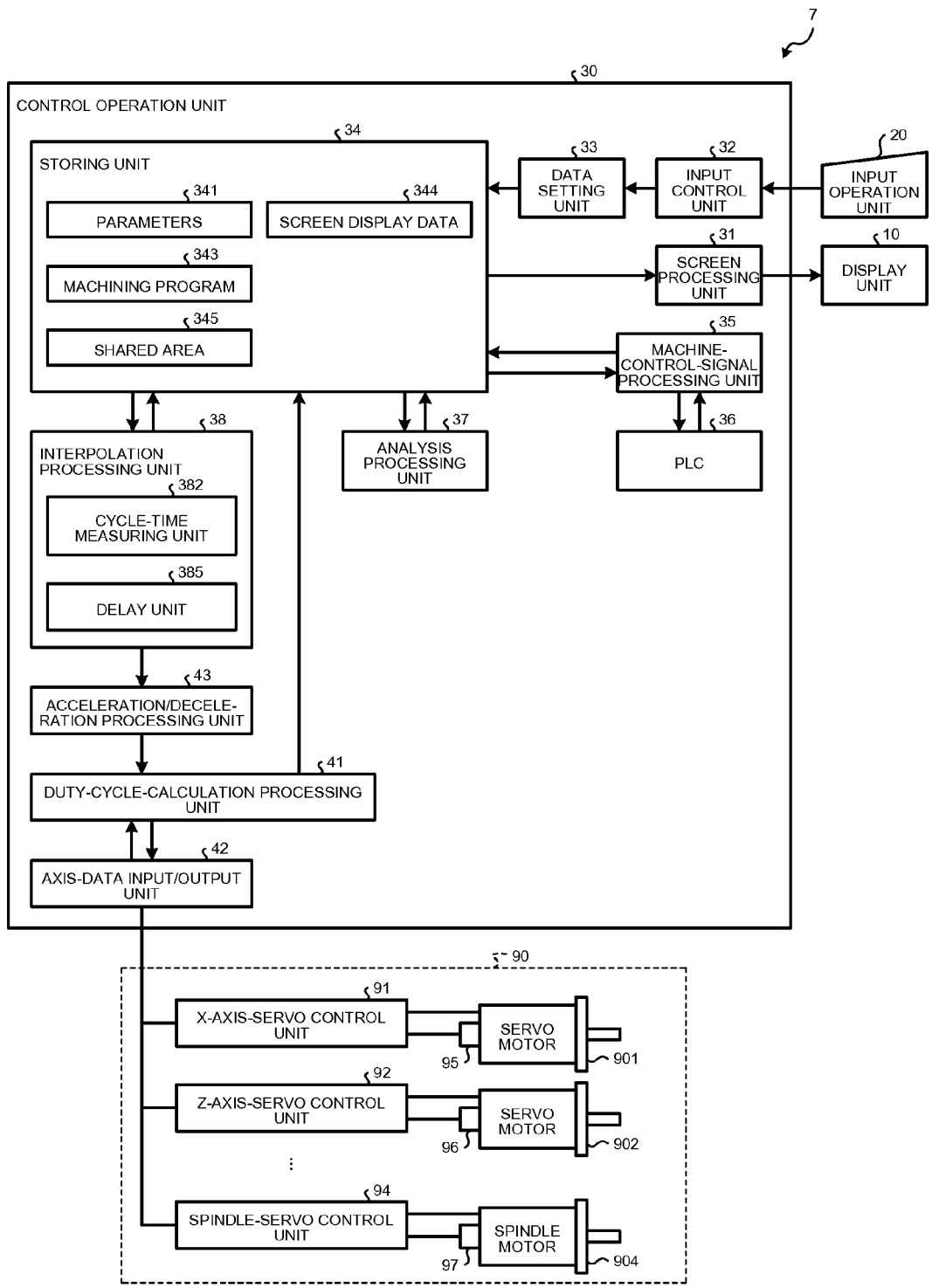
FIG. 23 is a diagram of the configuration of a numerical control apparatus in a seventh embodiment of the present invention.

FIG. 23 is a diagram of the configuration of a numerical control apparatus in a seventh embodiment of the present invention. As shown in the figure, the configuration of a numerical control apparatus 7 is different from the sixth embodiment in that the cycle-time measuring unit 382 same as the cycle-time measuring unit 382 in the first embodiment is added and the numerical control apparatus 7 includes a delay unit 385 instead of the delay unit 383.

Figure 24:
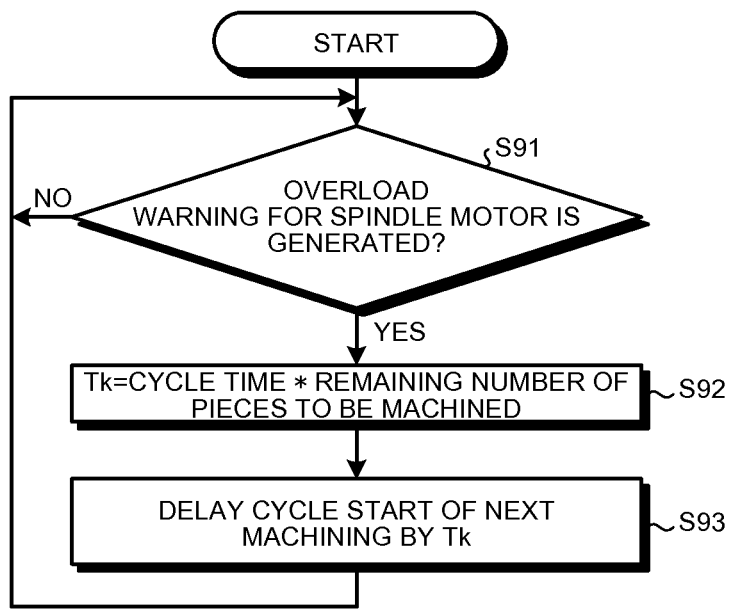
FIG. 24 is a flowchart for explaining the operation of the numerical control apparatus in the seventh embodiment.

FIG. 24 is a flowchart for explaining the operation of the numerical control apparatus 7 in the seventh embodiment. As shown in the figure, when the numerical control apparatus 7 starts continuous operation, the delay unit 385 determines whether an overload warning for the spindle motor 904, which is issued before the spindle motor 904 overheats, has been generated (step S91). When the overload warning for the spindle motor 904 has been generated (Yes at step S91), the delay unit 385 multiplies a cycle time with a remaining number of pieces to be machined and calculates the machining halt time Tk (step S92). Note that the cycle time can be acquired from the cycle-time measuring unit 382. The remaining number of pieces to be machined can be obtained by subtracting a value of a number-of-machined-pieces counter from the planned number of machined pieces set in the parameters 341.

Subsequently, the delay unit 385 delays a cycle start of the next machining by the calculated machining halt time Tk (step S93). When the overload warning for the spindle motor 904 has not been generated (No at step S91) or after the processing at step S93, the delay unit 385 executes the determination processing at step S91 again.

In this way, according to the seventh embodiment, the numerical control apparatus 7 includes the cycle-time measuring unit 382 that measures a cycle time and the delay unit 385 that delays, when an overload warning for the spindle motor 904 has been generated, a start of the next cycle until the time of a value obtained by multiplying a measurement value of the cycle time by the cycle-time measuring unit 382 with the remaining number of pieces to be machined elapses. Consequently, it is possible to obtain effects same as the effects in the sixth embodiment.

Industrial Applicability

As explained above, the numerical control apparatus according to the present invention is suitably applied to a numerical control apparatus that repeatedly executes a machining program.

Reference Signs List 1 to 7 Numerical control apparatuses
10 Display unit
20 Input operation unit
30 Control operation unit
31 Screen processing unit
32 Input control unit
33 Data setting unit
34 Storing unit
35 Machine-control-signal processing unit
37 Analysis processing unit
36 PLC (Programmable Logic Controller)
38 Interpolation processing unit
41 Duty-cycle-calculation processing unit
42 Axis-data input/output unit
43 Acceleration/deceleration processing unit
90 Driving unit 91 X-axis-servo control unit
92 Z-axis-servo control unit
94 Spindle-servo control unit
95 X-axis position sensor
96 Z-axis position sensor
97 Spindle sensor
341 Parameters
343, 346 Machining programs
344 Screen display data
345 Shared area
347 Continuous operation time information
371 Halt-time-variable setting unit
372 Spindle-position-command check unit
381, 383, 385 Delay units
382 Cycle-time measuring unit
411 Number-of-machined pieces estimating unit
412 Duty-cycle-display processing unit
413 Duty-cycle-warning processing unit
431 Acceleration/deceleration processing changing unit
901 X-axis servo motor
902 Z-axis servo motor
904 Spindle motor
1311, 1312, 1313, 1314, 1411, 1412, 1413, 1414 Rotation sections

The invention claimed is:

1. A numerical control apparatus comprising:
a cycle-time measuring unit that measures a cycle time in machining a workpiece;
a current-amount measuring unit that measures a current amount per unit cycle flowing to a motor that drives a workpiece rotating shaft;
a cycle-time calculating unit that calculates, on the basis of the measured current amount per unit cycle, a cycle time at which suppression of an occurrence of overheating of the motor is guaranteed;
a processing unit that determines on the basis of a comparison of a cycle time calculation value by the cycle-time calculating unit and a cycle time measurement value by the cycle-time measuring unit whether the motor overheats;
a delay unit that delays, when the processing unit determines that the motor overheats, a start of a next cycle by at least a value obtained by subtracting the cycle time measurement value from the cycle time calculation value; and
a machining-program storing unit that stores in advance a machining program for machining the workpiece, the machining program including, before a rewind code, a halt code for halting the machining by a delay amount to be set later, wherein
the delay unit sets, to the delay amount of the halt code, a value obtained by subtracting the cycle time measurement value from the cycle time calculation value.

2. The numerical control apparatus according to claim 1, further comprising an acceleration/deceleration processing changing unit that determines, when the processing unit determines that the motor overheats, presence or absence of a section in which the motor stops between two rotation periods based on speed control and position control is absent between the two rotation periods and causes, when the section is present, a part or all of deceleration processing immediately before the section and a part of all of acceleration processing immediately after the section not to be executed and the rotation of the motor to be continued during the section.

3. The numerical control apparatus according to claim 1, further comprising a display processing unit that displays the cycle time calculation value and the cycle time measurement value or a difference value between the cycle time measurement value and the cycle time calculation value.

4. The numerical control apparatus according to claim 1, further comprising a display processing unit that displays a warning when the processing unit determines that the motor overheats.

5. The numerical control apparatus according to claim 1, further comprising a parameter storing unit that stores a rated output of the motor in advance, wherein the cycle-time calculating unit calculates, using the rated output of the motor stored by the parameter storing unit, a cycle time during which suppression of the occurrence of overheating of the motor is guaranteed.

* * * * *